US007818124B2

(12) United States Patent
Herbst et al.

(10) Patent No.: US 7,818,124 B2
(45) Date of Patent: *Oct. 19, 2010

(54) METHOD OF OPERATING A NAVIGATION SYSTEM USING IMAGES

(75) Inventors: James M. Herbst, Chicago, IL (US); Suzanne M. McGrath, Chicago, IL (US); Jason M. Borak, Algonquin, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,488

(22) Filed: Oct. 17, 2008

(65) Prior Publication Data

US 2009/0037103 A1      Feb. 5, 2009

Related U.S. Application Data

(63) Continuation of application No. 10/880,815, filed on Jun. 30, 2004, now Pat. No. 7,460,953.

(51) Int. Cl.
*G01C 21/30*    (2006.01)
(52) U.S. Cl. ............... 701/211; 701/208; 340/995.1; 340/995.19
(58) Field of Classification Search ............ 701/211, 701/208; 340/995.1, 995.19
See application file for complete search history.

(56) References Cited

U.S. PATENT DOCUMENTS

| | | | | |
|---|---|---|---|---|
| 5,115,398 A | 5/1992 | De Jong | ............... | 701/200 |
| 5,396,431 A * | 3/1995 | Shimizu et al. | ............... | 701/213 |
| 5,731,766 A | 3/1998 | Akamatsu | ............... | 340/988 |
| 5,739,773 A | 4/1998 | Morimoto et al. | ............... | 340/990 |
| 5,815,411 A | 9/1998 | Ellenby et al. | ............... | 364/559 |
| 5,835,489 A | 11/1998 | Moriya et al. | ............... | 370/342 |
| 5,917,436 A | 6/1999 | Endo et al. | ............... | 340/995.14 |
| 5,941,932 A | 8/1999 | Aikawa et al. | ............... | 701/208 |
| 5,974,876 A | 11/1999 | Hijikata et al. | ............... | 73/178 |

(Continued)

FOREIGN PATENT DOCUMENTS

DE      19531766 A1      3/1997

(Continued)

OTHER PUBLICATIONS

European search report, EPA # 05254126.5-2213, dated Nov. 23, 2005.

(Continued)

*Primary Examiner*—Mark Hellner
*Assistant Examiner*—Helal A Algahaim
(74) *Attorney, Agent, or Firm*—Jon D. Shutter; Frank J. Kozak; Lisa M. Schoedel

(57) ABSTRACT

A method of operating a navigation system determines a route between an origin and a destination and provides a photographic image showing a geographic area through which the route passes. The photographic image is obtained from a geographic database, and the photographic image shows the geographic area from a land-based viewpoint. The method overlays a route highlight on the photographic image identifying a path to be traveled. The route highlight extends along the path for a distance visible in the photographic image.

18 Claims, 19 Drawing Sheets

U.S. PATENT DOCUMENTS

| | | | | |
|---|---|---|---|---|
| 6,023,241 | A | 2/2000 | Clapper | 342/357.13 |
| 6,133,947 | A | 10/2000 | Mikuni | 348/143 |
| 6,141,014 | A | 10/2000 | Endo et al. | 345/427 |
| 6,169,552 | B1 | 1/2001 | Endo et al. | 345/427 |
| 6,182,010 | B1* | 1/2001 | Berstis | 701/211 |
| 6,199,014 | B1 | 3/2001 | Walker et al. | 701/211 |
| 6,282,362 | B1 | 8/2001 | Murphy et al. | 386/46 |
| 6,292,745 | B1 | 9/2001 | Robare et al. | 701/208 |
| 6,351,710 | B1 | 2/2002 | Mays | 701/211 |
| 6,356,835 | B2 | 3/2002 | Hayashi et al. | 701/208 |
| 6,356,837 | B1 | 3/2002 | Yokota et al. | 701/208 |
| 6,414,696 | B1 | 7/2002 | Ellenby et al. | |
| 6,466,865 | B1 | 9/2002 | Petzold et al. | 701/202 |
| 6,539,288 | B2 | 3/2003 | Ishida et al. | 701/1 |
| 6,563,529 | B1* | 5/2003 | Jongerius | 348/36 |
| 6,577,249 | B1 | 6/2003 | Akatsuka et al. | 340/988 |
| 6,621,423 | B1 | 9/2003 | Cooper et al. | 340/995.24 |
| 6,741,929 | B1 | 5/2004 | Oh et al. | 701/209 |
| 6,810,323 | B1 | 10/2004 | Bullock et al. | 701/206 |
| 6,850,269 | B2 | 2/2005 | Maguire | 348/149 |
| 6,871,143 | B2 | 3/2005 | Fujiwara | 701/211 |
| 6,895,126 | B2 | 5/2005 | DiBernardo et al. | 382/284 |
| 6,983,203 | B1 | 1/2006 | Wako | 701/208 |
| 7,006,916 | B2 | 2/2006 | Kawasaki | 701/211 |
| 2002/0001032 | A1 | 1/2002 | Ohki | 348/207 |
| 2002/0047895 | A1 | 4/2002 | Bernardo et al. | 348/48 |
| 2002/0075323 | A1 | 6/2002 | O'Dell | 345/835 |
| 2002/0128766 | A1 | 9/2002 | Petzold et al. | 701/201 |
| 2002/0169547 | A1 | 11/2002 | Harada | 701/211 |
| 2002/0187831 | A1* | 12/2002 | Arikawa et al. | 463/32 |
| 2003/0078724 | A1 | 4/2003 | Kamikawa et al. | 701/208 |
| 2003/0151664 | A1 | 8/2003 | Wakimoto et al. | 348/148 |
| 2003/0208315 | A1 | 11/2003 | Mays | 701/211 |
| 2003/0220736 | A1 | 11/2003 | Kawasaki | 701/211 |
| 2004/0070602 | A1* | 4/2004 | Kobuya et al. | 345/738 |
| 2004/0220730 | A1 | 11/2004 | Chen et al. | 701/210 |
| 2004/0249565 | A1 | 12/2004 | Park | 701/200 |
| 2005/0216193 | A1 | 9/2005 | Dorfman et al. | 701/213 |
| 2008/0291201 | A1 | 11/2008 | Lafon | 345/427 |
| 2008/0291217 | A1 | 11/2008 | Vincent et al. | 345/629 |
| 2008/0292213 | A1 | 11/2008 | Chau et al. | 382/294 |
| 2009/0240431 | A1 | 9/2009 | Chau et al. | 701/208 |

FOREIGN PATENT DOCUMENTS

| | | |
|---|---|---|
| EP | 0406946 | 9/1991 |
| EP | 0539144 A3 | 10/1992 |
| EP | 0867690 | 9/1998 |
| EP | 1024347 | 2/2000 |
| EP | 1271104 A2 | 1/2003 |
| EP | 1349363 | 10/2003 |
| EP | 1305783 | 11/2004 |
| JP | 11-086027 | 3/1999 |
| JP | 11-86027 | 3/1999 |
| JP | 2000148009 A * | 5/2000 |
| JP | 2001-227965 | 8/2001 |
| JP | 2003-037838 | 7/2003 |
| JP | 2003-227722 | 8/2003 |
| JP | 2004-062755 | 2/2004 |
| JP | 2004-62756 | 2/2004 |
| WO | WO 02/27272 A1 | 4/2002 |
| WO | WO 2004/003852 | 6/2003 |
| WO | WO 02/063243 A1 | 8/2003 |

OTHER PUBLICATIONS

European search report, EPA # 05254076.2-1236, dated Oct. 15, 2008.

Google Information-Google Milestones, http://www.google.com/corporate/history.html , p. 13, lines 4-5 (Apr. 23, 2010).

* cited by examiner

METHOD OF OPERATING A NAVIGATION SYSTEM USING IMAGES

REFERENCE TO RELATED APPLICATIONS

The present application is a continuation of application Ser. No. 10/881,815, now U.S. Pat. No. 7,460,953, filed on Jun. 30, 2004, which was related to the co-pending applications: application Ser. No. 10/881,310, now U.S. Pat. No. 7,149,626, filed Jun. 30, 2004, application Ser. No. 10/881,312, now U.S. Pat. No. 7,266,447, filed on Jun. 30, 2004, application Ser. No. 10/880,660, now U.S. Pat. No. 7,421,341, filed on Jun. 30, 2004, application Ser. No. 10/881,660 filed on Jun. 30, 2004, and application Ser. No. 10/880,816 filed on Jun. 30, 2004, the entire disclosures of which are incorporated by reference herein.

BACKGROUND OF THE INVENTION

The present invention relates to a method and system for providing navigation features and functions, and more particularly to a method and system for collecting images and providing navigation features using the images.

Vehicle navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers for the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as the positions of the roads, speed limits along portions of roads, address ranges along the road portions, turn restrictions at intersections of roads, direction restrictions, such as one-way streets, and so on. Additionally, the geographic data may include points of interest, such as restaurants, hotels, airports, gas stations, stadiums, police stations, and so on.

Although navigation systems provide many important features, there continues to be room for new features and improvements. One area in which there is room for improvement relates to providing improved guidance for following the route. In some situations, additional guidance and orientation information would be helpful when following the route. For example, some areas may be difficult for a user of a navigation system 100 to traverse because of the many road segments intersecting in the area and the many different turn options available to travel. Additionally, pedestrians may find additional guidance and orientation information helpful when traversing a route because pedestrians have a greater degree of freedom of motion and may become more frequently confused as to their orientation to destination.

Accordingly, it would be beneficial to have a way to collect and provide images that may be used to provide improved navigation-related functions and features.

SUMMARY OF THE INVENTION

A method and system of operating a navigation system is described in the embodiments disclosed herein. The method provides an image of a geographic area through which a portion of a route between an origin and destination passes. The image may be an approximate 360-degree image. The image may include a guidance information overlay on the image, such as a route highlight, a maneuver arrow, an indication of a path that has been traveled, a main route and alternative route, and a label. The images with the guidance information overlays may orient and provide guidance to the user of the navigation system.

In another embodiment, the method of operating a navigation system provides an image of a geographic region and overlays the image with labels identifying locations in the image. The method enables a user of the navigation system to enter one of the locations and provides a navigation feature for the entered location. The image may be a single-view photograph or a panoramic photograph. The locations identified with labels may be points of interests.

BRIEF DESCRIPTION OF THE DRAWINGS

An exemplary embodiment of the present invention is described herein with reference to the drawings, in which.

DETAILED DESCRIPTION OF THE PRESENTLY PREFERRED EMBODIMENTS

I. Navigation System

Figure 1:
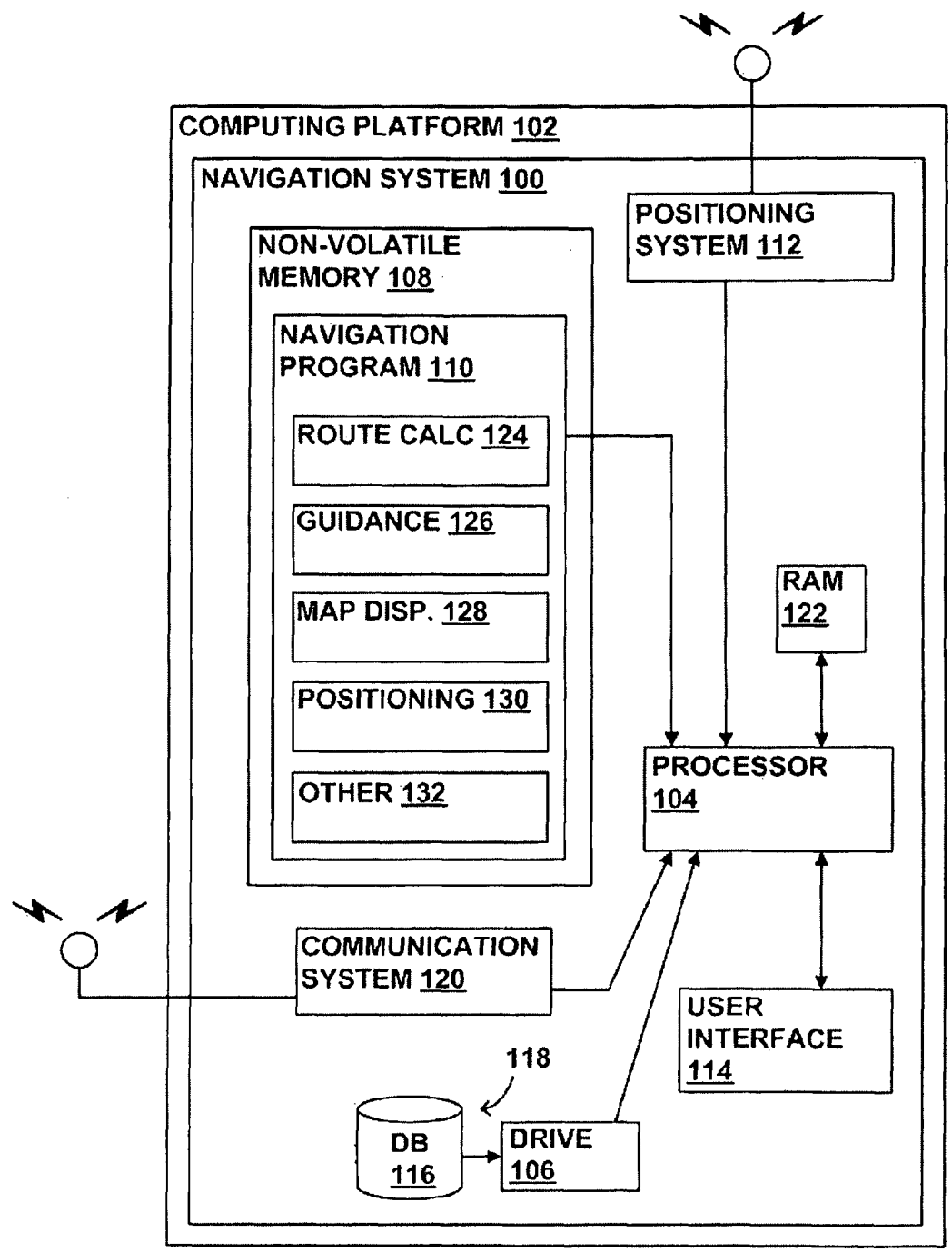
FIG. 1 is a block diagram of a navigation system, according to an exemplary embodiment.

FIG. 1 is a block diagram of a navigation system 100 associated with a computing platform 102, such as a personal digital assistant (PDA), mobile telephone or any computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The input information may include a request for navigation features and functions of the navigation system 100. In one embodiment, information from the navigation system 100 is provided on a display screen of the user interface 114. To provide navigation features and functions, the navigation system 100 uses a geographic database 116 stored on a storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128, and positioning 130 (e.g., map matching).

Other functions and programming 132 may be included in the navigation system 100. The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
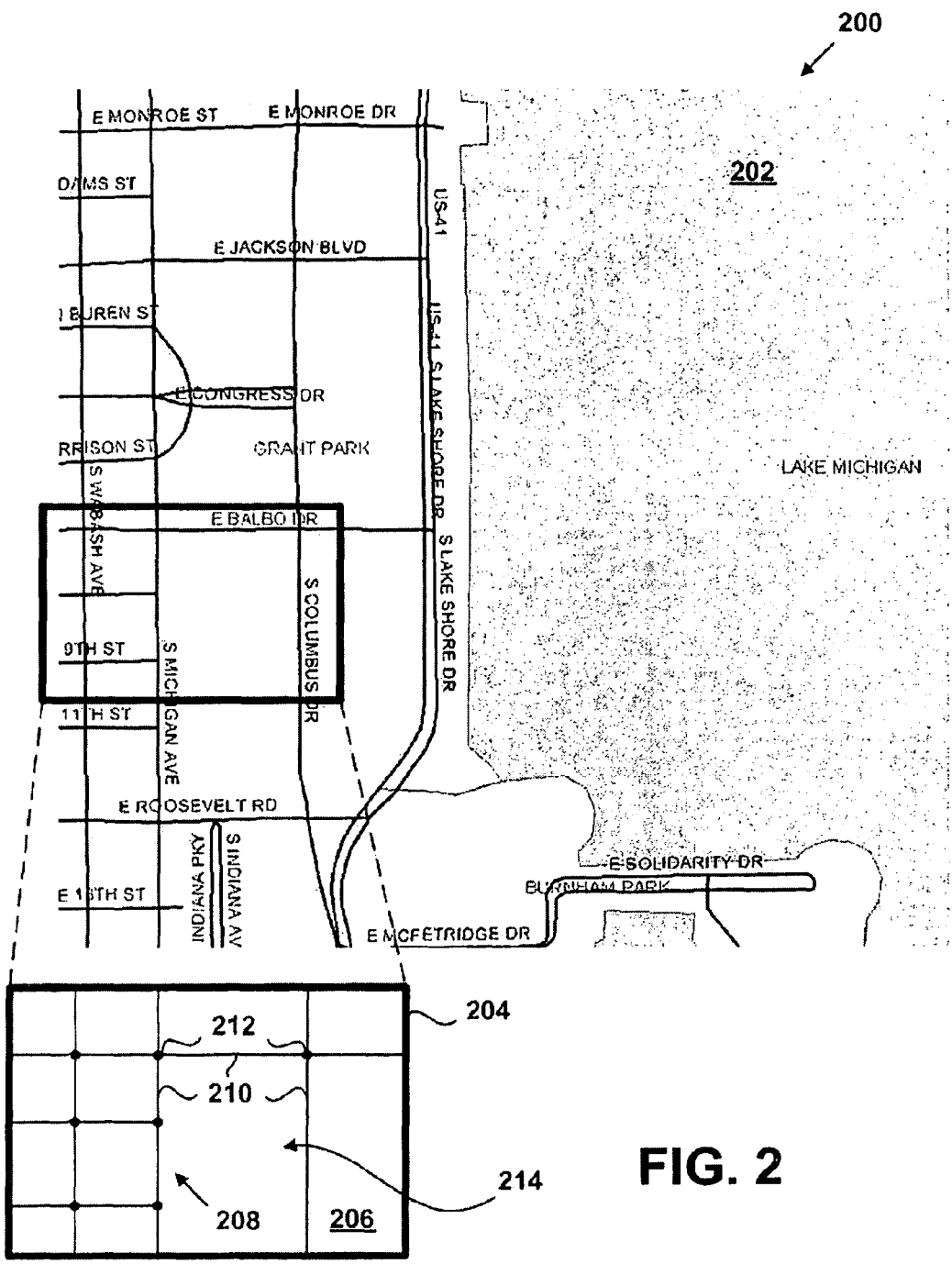
FIG. 2 illustrates a map of a geographic region.

In order to provide navigation-related features and functions to the end user, the navigation system 100 uses the geographic database 116. The geographic database 116 includes information about one or more geographic regions. FIG. 2 illustrates a map 200 of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 also includes an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead-ends. Also included in the portion 206 of the geographic region 202 are paths or a path network (not shown) that may be traversed by pedestrians, such as in a park or plaza.

Figure 3:
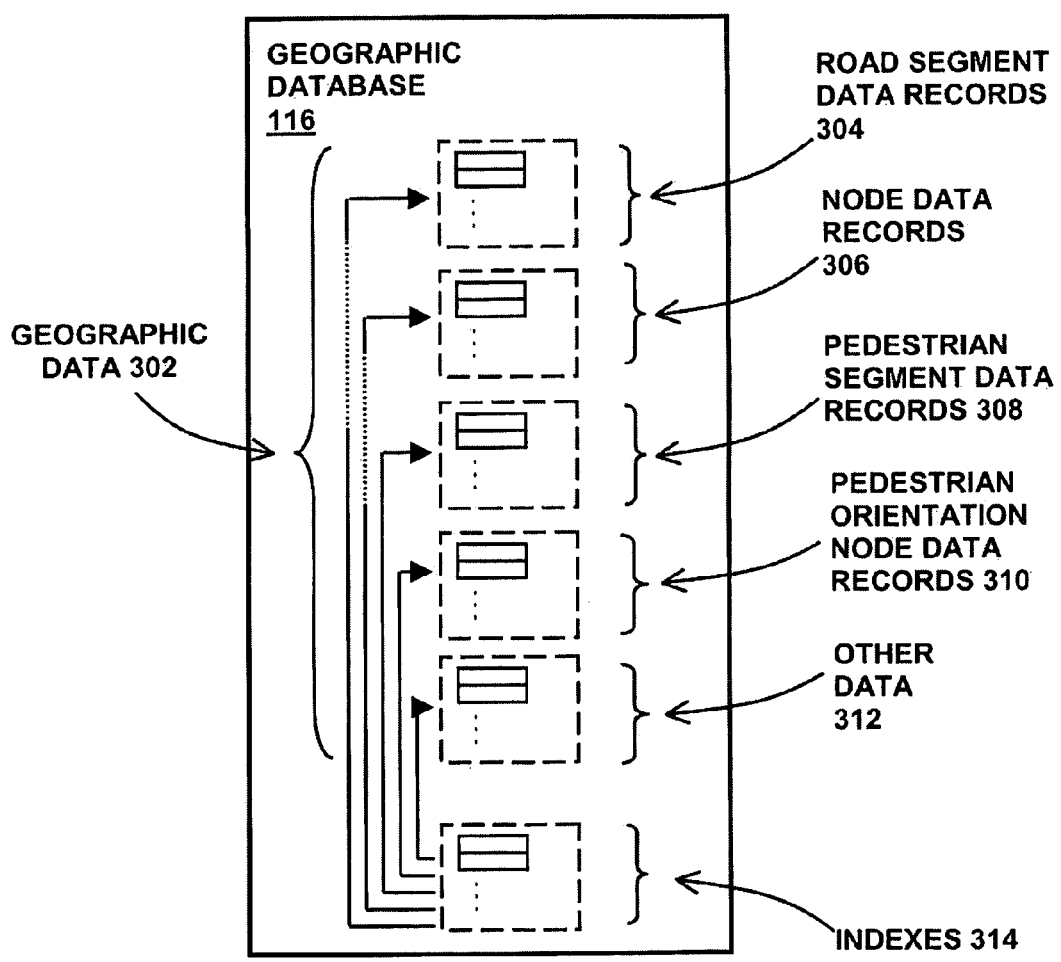
FIG. 3 is a block diagram of a geographic database included in the navigation system depicted in FIG. 1, according to an exemplary embodiment.

Referring to FIG. 3, the geographic database 116 contains data 302 that represents some of the physical geographic features in the geographic region 202 depicted in FIG. 2. The data 302 contained in the geographic database 116 includes data that represent the road network 208. In the embodiment of FIG. 3, the geographic database 116 that represents the geographic region 202 contains at least one road segment database record 304 (also referred to as "entity" or "entry") for each road segment 210 in the geographic region 202. The geographic database 116 that represents the geographic region 202 also includes a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts. In one embodiment, the geographic database 116 that represents the geographic region 202 also contains at least one pedestrian segment database record 308 for each pedestrian segment in the geographic region 202 and orientation node database record 310 for each orientation node in the geographic region 202. Pedestrian segments and orientation nodes are associated with paths that may be traversed by pedestrians, such as in the park or plaza. A more detailed description of pedestrian segments and orientation nodes may be found in the co-pending application entitled "METHOD OF COLLECTING INFORMATION FOR A GEOGRAPHIC DATABASE FOR USE WITH A NAVIGATION SYSTEM" filed on the same date herewith, Attorney Docket No. N0181US, the entire disclosure of which is incorporated by reference herein.

The geographic database 116 may also include other kinds of data 312. The other kinds of data 312 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 4:
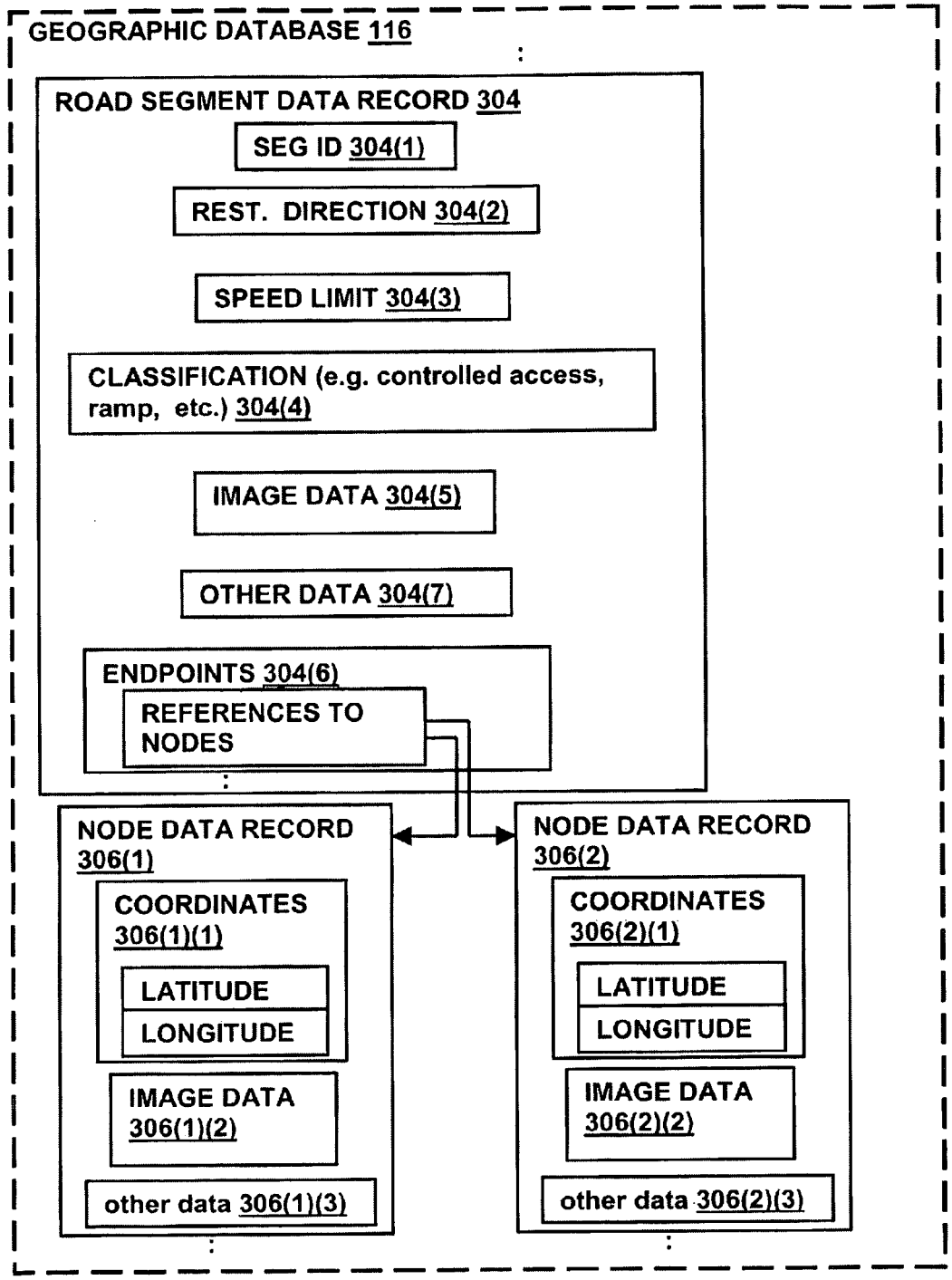
FIG. 4 is a block diagram of road segment data records and node data records contained in the geographic database depicted in FIG. 3, according to an exemplary embodiment.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 includes data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

The road segment data record 304 also includes data 304(6) providing the geographic coordinates (e.g., the latitude and longitude) of the end points of the represented road segment. In one embodiment, the data 304(6) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 4 also shows some of the components of a node data record 306 contained in the geographic database 116. Each of the node data records 306 may have associated information (such as "attributes", "fields", etc.) that allows identification of the road segment(s) that connect to it and/or it's geographic position (e.g., its latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

Figure 5:
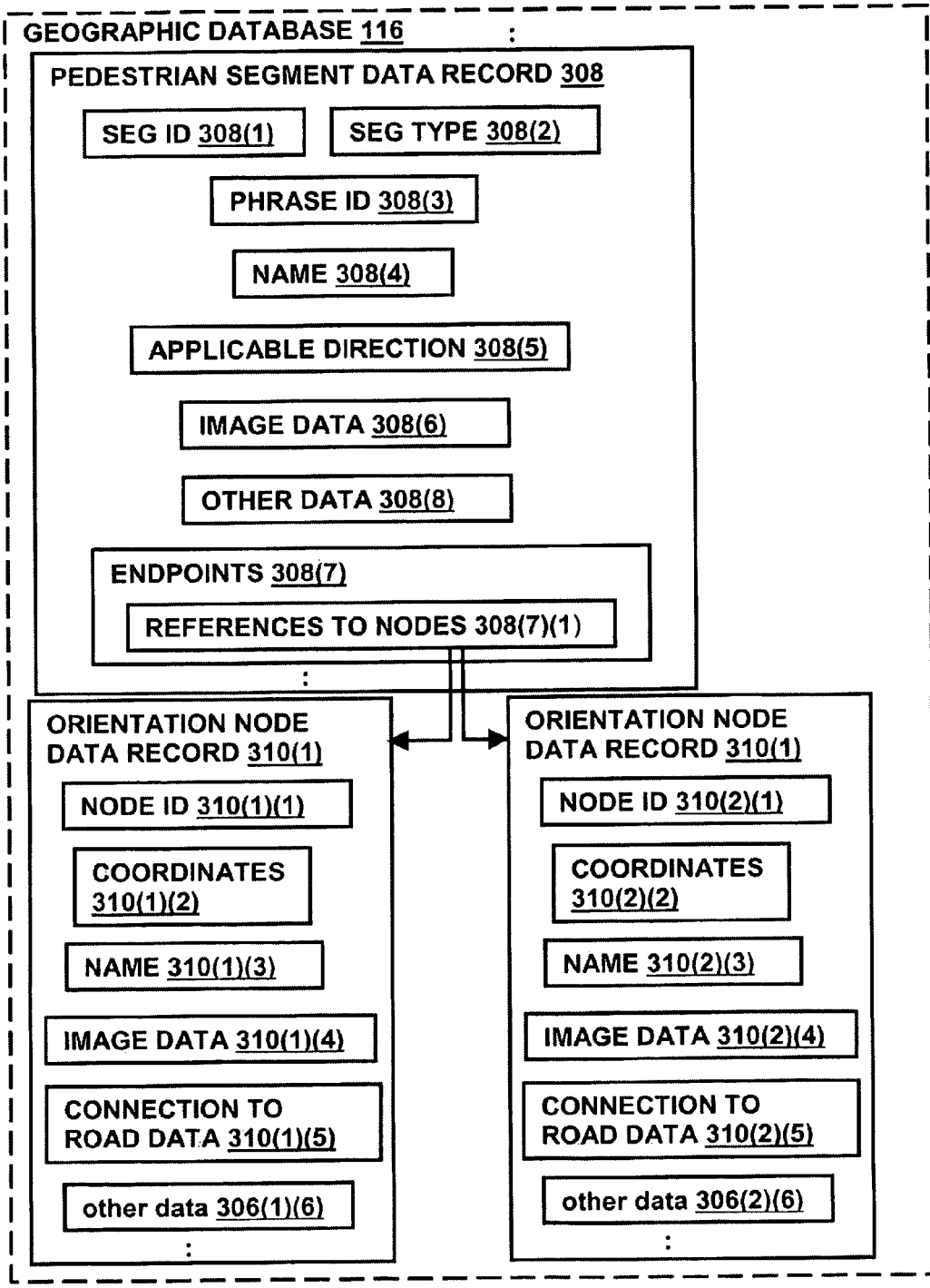
FIG. 5 is a block diagram of pedestrian segment data records and orientation node data records contained in the geographic database depicted in FIG. 3, according to an exemplary embodiment.

FIG. 5 shows some of the components of a pedestrian segment data record 308 contained in the geographic database 116. The pedestrian segment data record 308 includes a segment ID 308(1) by which the data record can be identified in the geographic database 116. Each pedestrian segment data record 308 has associated with it information (such as "attributes", "fields", etc.) that describes features of the represented pedestrian segment. The pedestrian segment data record 308 may include data 308(2) that indicate a type of pedestrian segment, such as virtual pedestrian path, paved pedestrian path, unpaved pedestrian path, sidewalk, alley, indoor path. The pedestrian segment data record 308 includes data 308(3) that indicate a phrase ID and data indicating a segment name 308(4) which together provide a text description of the pedestrian segment. The data indicating the phrase ID provides a predetermined phrase that accompanies the segment name to describe the pedestrian segment. The pedestrian segment data record 308 may also include applicable direction data 308(5) indicating whether direction of travel on the pedestrian segment affects how the pedestrian segment should be described, and if so, the direction of travel associated with the above data.

The pedestrian segment data record 308 also includes data 308(7) relating to the end points of the represented pedestrian segment. The endpoint data includes data 308(7) include references 308(7)(1) to the orientation node data records 310 that represent the orientation nodes corresponding to the end points of the represented pedestrian segment. The pedestrian segment data record 308 may also include or be associated with other data 308(8) that refer to various other attributes of the represented pedestrian segment. The various attributes associated with a pedestrian segment may be included in a single pedestrian segment record, or may be included in more than one type of record that cross-references to each other.

FIG. 5 also shows some of the components of an orientation node data record 310 contained in the geographic database 116. Each orientation node data record 310(1) and 310(2) include a node ID 310(1)(1) and 310(2)(1) by which the data record can be identified in the geographic database 116. Each of the orientation node data records 310 may have associated information (such as "attributes", "fields", etc.) that allows identification of the pedestrian segment(s) that connect to it and/or it's geographic position (e.g., its latitude and longitude coordinates). For the embodiment shown in FIG. 5, the orientation node data records 310(1) and 310(2) include the latitude and longitude coordinates 310(1)(2) and 310(2)(2) for their node.

Each orientation node data record also includes data indicating an orientation node name 310(1)(3) and 310(2)(3). Each orientation node data record also includes connection data 310(1)(5) and 310(2)(5) indicating connection, if any, to the road network. In one embodiment, the connection data 310(1)(5) and 310(2)(5) are references to the road segment data records 304 and/or road network node data records 306 that represent the road segments and nodes that connect with the orientation node. The node data records 310(1) and 310(2) may also include other data 310(1)(6) and 310(2)(6) that refer to various other attributes of the nodes.

III. Collecting Images

Referring to FIG. 1, the navigation system 100 provides various navigation-related features and functions including route guidance 126. Route guidance 126 provides a user of the navigation system 100 with detailed directions for reaching a desired destination. In one embodiment, the directions include maneuver instructions at specified intersections.

Figure 6:
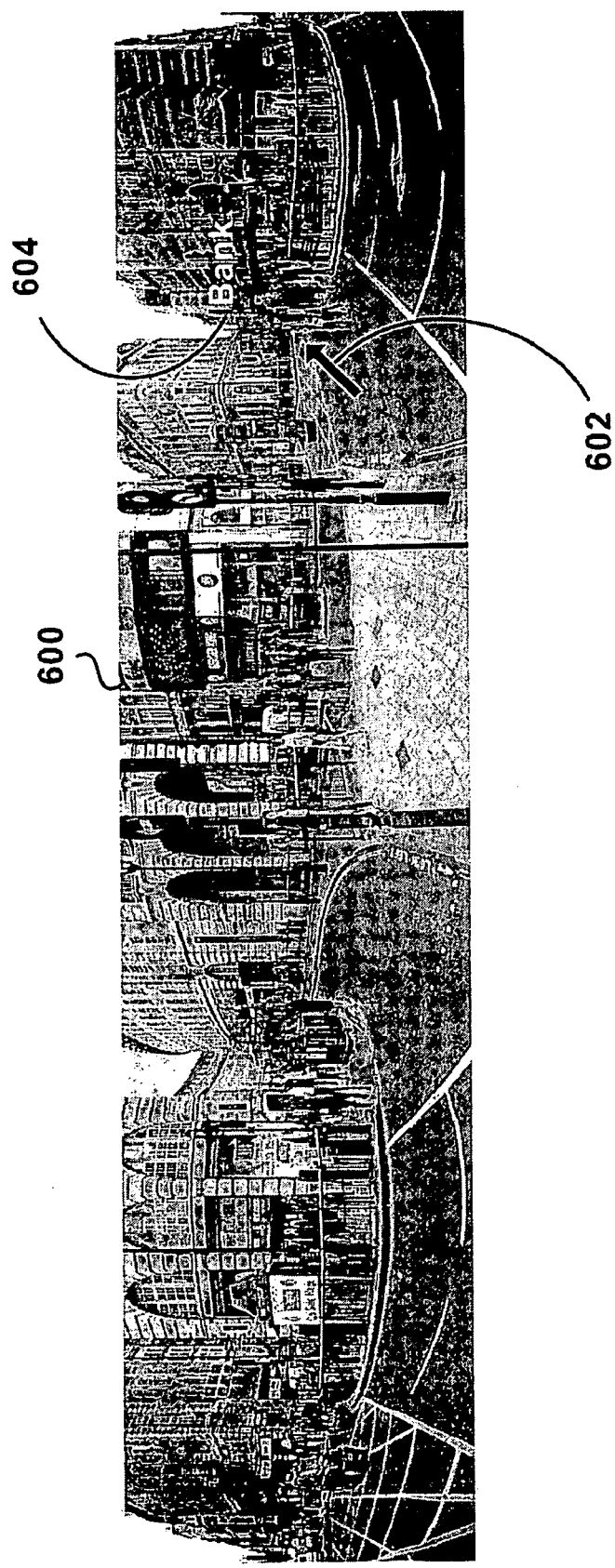
FIG. 6 is a 360-degree panoramic image of an intersection.

Some areas within the geographic region 202 may be difficult to traverse even with the detailed directions from the conventional route guidance feature 126. FIG. 6 is a 360-degree panoramic image 600 of Piccadilly Circus in London, England. Piccadilly Circus is an example of an area that may be difficult for a user of a navigation system 100 to traverse because of the many road segments intersecting in the area and the many different turn options available to travel. Additionally, a pedestrian may have difficulty traversing some areas, such as Piccadilly Circus, because the pedestrian has a greater freedom of movement as a vehicle. The pedestrian does not have direction restrictions as a vehicle; the pedestrian can walk down a one-way street in both directions. Moreover, the pedestrian may become more frequently confused as to direction of travel and orientation.

To allow the navigation system 100 to provide improved route guidance, a geographic database developer collects image data of road segments, road nodes or intersections, pedestrian segments, orientation nodes and any other geographic feature. In one embodiment, a geographic researcher travels the geographic region to collect image data. In another embodiment, the geographic researcher obtains image data from other sources, such as an image repository.

Figure 7:
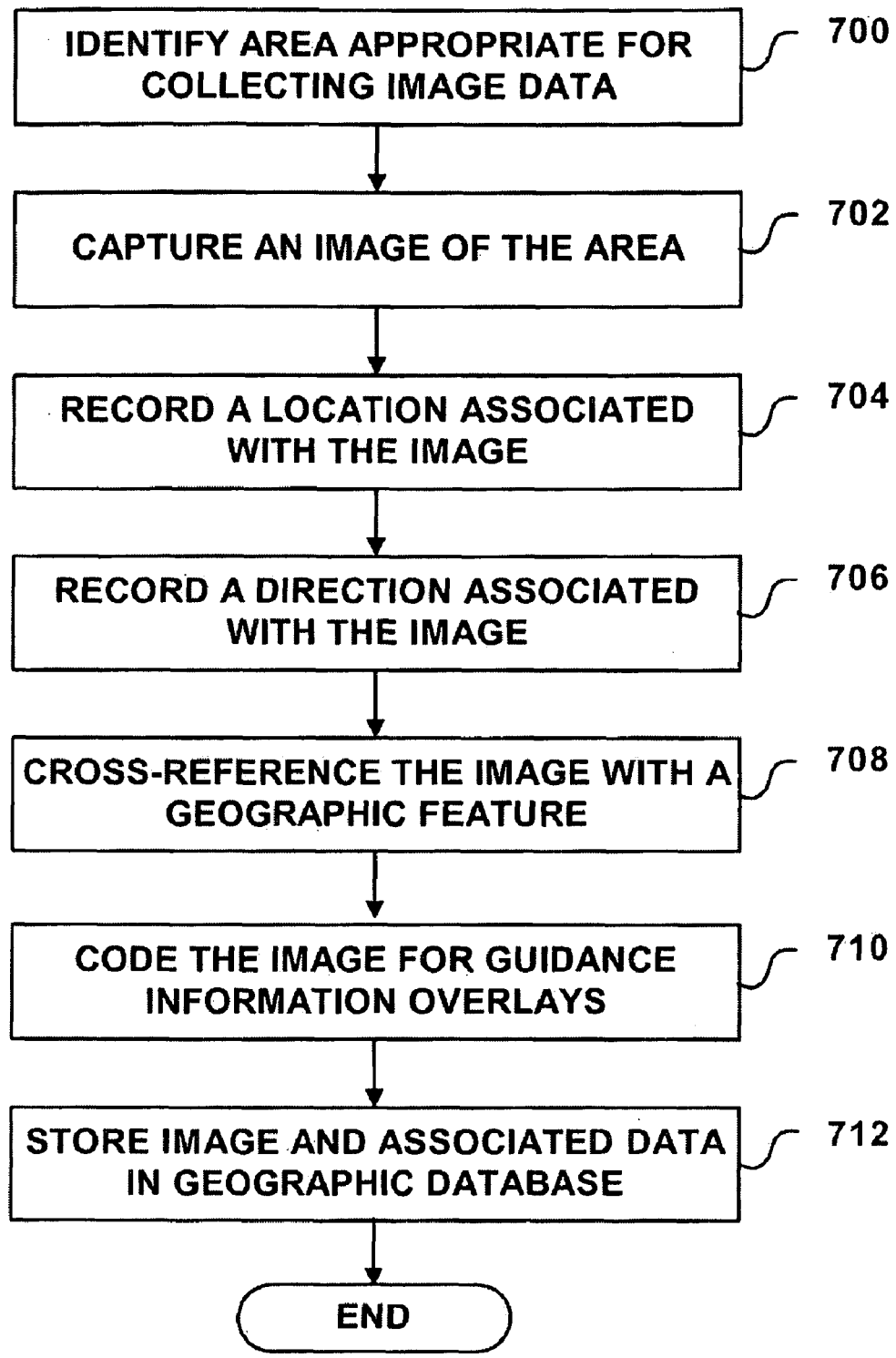
FIG. 7 is a flow chart for collecting image data, according to an exemplary embodiment.

FIG. 7 is a flow chart for collecting image data in the geographic region 202, according to an exemplary embodiment. At step 700, the researcher identifies an area of the geographic region appropriate for collecting image data. In one embodiment, the area appropriate for collecting image data is a confusing intersection. In another embodiment, the areas appropriate for collecting image data are decision points along a road or pedestrian network at which the user of the navigation system 100 has an option of turning. In other embodiments, the area appropriate for collecting image data may be any intersection, road segment, pedestrian segment, orientation node, scenic view, point of interest, such as a business or facility, or any other geographic feature. In another embodiment, the researcher collects a series of images along the road and/or pedestrian segments to enable a user to obtain a continuous visual representation of a route or a visual representation of a significant portion of the route.

At step 702, the researcher captures a photographic image of the area. The certain geographic areas, images may be taken during the day and at night. Additionally, it may be more desirable to capture the image when the weather is dry to obtain clear photographs. Further, the photographs may be taken when the area is empty, so that cars and pedestrians do not obscure the view.

In one embodiment, the geographic researcher uses a digital camera, a video camera, a film camera or any other device to obtain the images. The images may be a single view, 180-degree view, a 360-degree panoramic view, such as the 360-degree panoramic image 600 of FIG. 6, or any other type of image. In one embodiment, the 360-degree panoramic image may be taken by using a camera designed to take 360-degree panoramic photographs. For example, the camera may have a fisheye/180/360 degree camera lens. Alternatively, the 360-degree panoramic image may be stitched together from a series of single view images showing a section of the 360-degree view as known to one skilled in the art. After capturing the images, the images are digitally stored in a memory device.

At step 704, the researcher records a location associated with the image. In one embodiment, the researcher records a position of the location from which the image was captured. In another embodiment, the researcher records the position and/or name of a geographic feature within the captured image, such as an intersection, road segment, building or any other feature. In a further embodiment, the researcher records the position and/or name of a geographic feature proximate the location from which the image was captured. The research may use a positioning system to determine the location. The positioning system may be the same or a different system as the positioning system 112 depicted in FIG. 1. The positioning system may utilize GPS-type technology, a dead reckoning-type system, or combinations of these or other systems, all of which are known in the art. The positioning system may include suitable sensing devices that measure the traveling distance speed, direction, and so on, of the system. The positioning system may also include appropriate technology to obtain a GPS signal, in a manner that is known in the art. The positioning system may provide as an output the latitude and longitude of the location at which the image was captured. In addition, maps and aerial images of the area may be used to determine the position associated with the captured image. The researcher may record the position information and any other information associated with the image using any data collection method, such as handwriting, voice recording and data entry into a user device.

At step 706, the researcher records a direction associated with the captured image. In one embodiment, the direction associated with the captured image is a direction in which the camera was facing when the image was captured. The researcher may determine the direction of the view using general knowledge, a compass, the positioning system or any other method of determining direction. In another embodiment, the direction associated with the image references a geographic feature captured in the image, such as along a road segment or at a building.

At step 708, the image is cross-referenced with at least one geographic feature. In one embodiment, the image is cross-referenced with a road-network node and/or a pedestrian orientation node. In another embodiment, the image is associated with a road segment, pedestrians segment and/or a position along a road segment or pedestrian segment. In a further embodiment, the image is associated with a point of interest, such as a building, business, restaurant, hotel, city hall, police station, historical marker, ATM or any other type of point of interest or any other geographic feature. The researcher may cross-reference the image with at least one of the geographic features by recording the geographic feature when capturing the image. Alternatively, the location, such as latitude and longitude coordinates, may be geo-coded to identify a geographic feature in the geographic database 116 in proximity to the location associated with the image.

Figure 8:
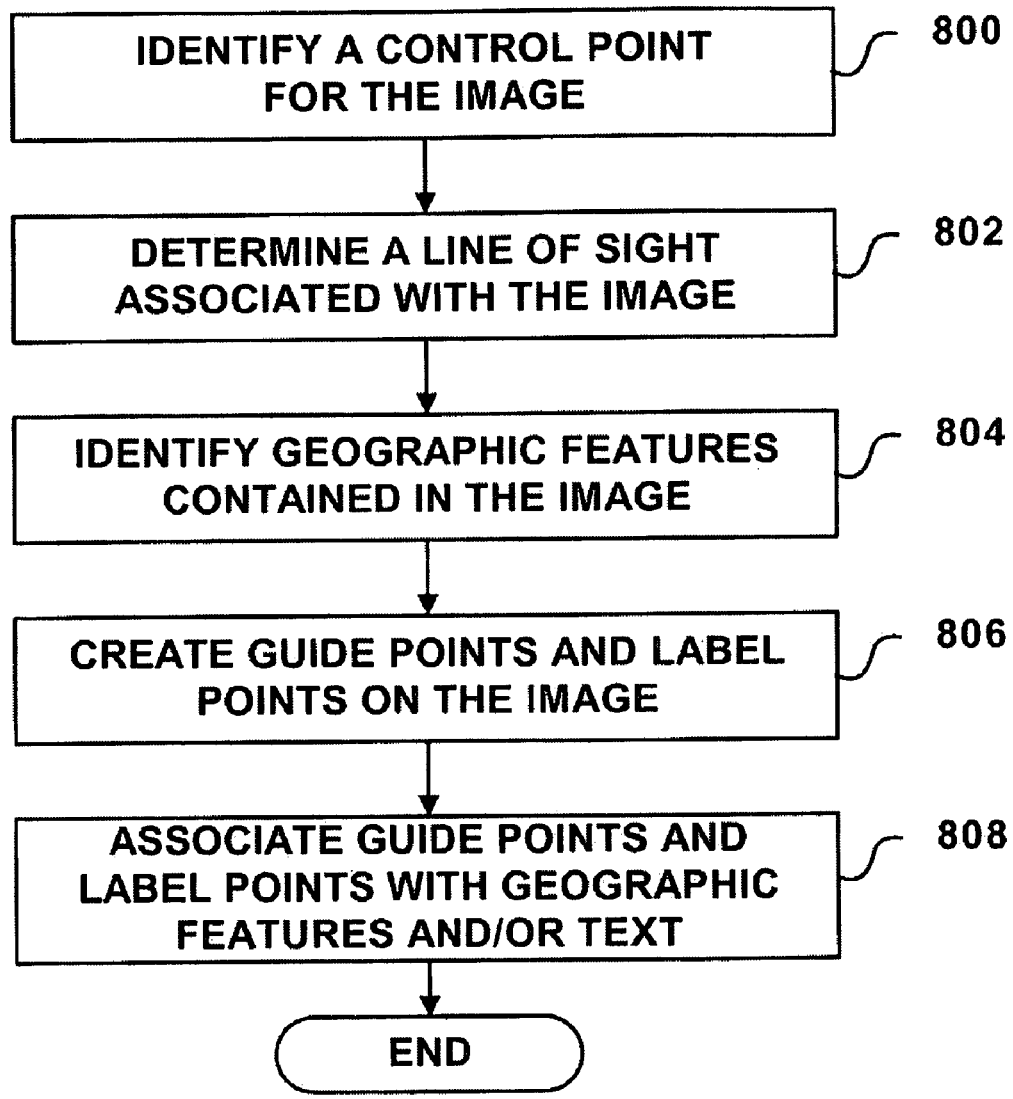
FIG. 8 is a flow chart for coding the image for guidance information overlays.

At block 710, the image is coded for guidance information overlays, such as a path, a specific maneuver, a direction of travel, a label or any other overlay. FIG. 8 below describes coding the image for guidance information overlays according to one embodiment. At step 712, the image and associated data are stored in the geographic database 116 as will be described in more detail below. In alternative embodiments, the steps for collecting image data are performed in a different order than presented in FIG. 7. Additionally, a geographic researcher traveling the geographic region may perform some of the above steps of FIG. 7, while another geographic researcher at a central base station may perform the remaining steps of FIG. 7.

Figure 9:
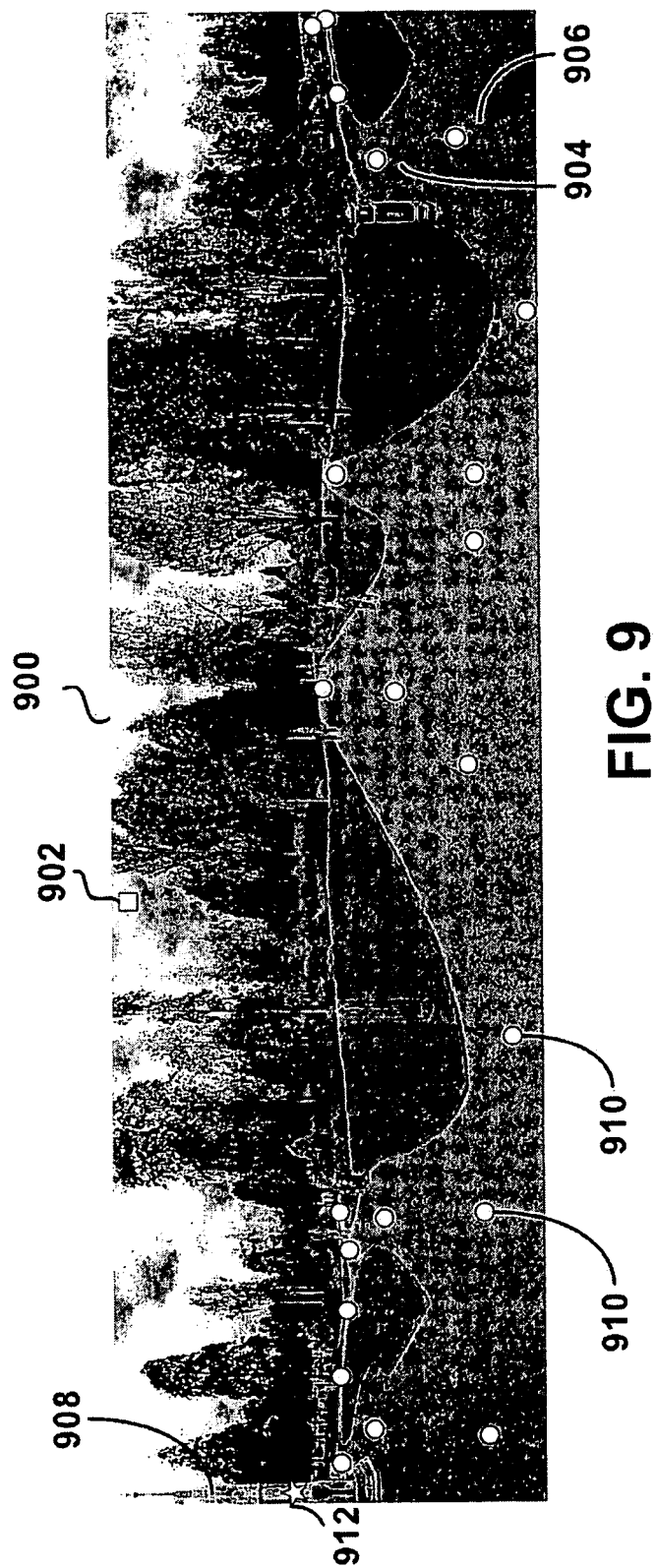
FIG. 9 is an image depicting coding for guidance information overlays.

FIG. 8 is a flow chart for coding the image for guidance information overlays according to one embodiment. Some of the steps of FIG. 8 will be illustrated with the image 900 of FIG. 9. At step 800, the researcher identifies a control point 902 for the image 900. In one embodiment, the control point 902 indicates a direction, such as north, in the image 900. In another embodiment, the control point 902 indicates a location at which the image was captured. At step 802, the researcher determines a line-of-sight associated with the captured image. The line-of-sight associated with the captured image is a distance that can be seen in the image 900, such as 20 meters. The line-of-sight may be calculated using standard Geographic Information Systems (GIS) software. Alternatively, the line-of-sight calculation may be performed using Digital Elevation Models (DEM). The line-of-sight may be limited by obstructions in the view, such as buildings and trees.

At step 804, the researcher identifies geographic features in the image 900. In one embodiment, road segments, nodes or intersections, pedestrian segments, pedestrian orientation nodes are identified. Additionally, any feature present in the image may be identified including lakes, rivers, railroads, municipalities, points of interest, such as buildings, businesses, restaurants, stores, hotels, municipal facilities, historical markers, ATMs, golf courses, water fountains, statues, bike racks, etc. For the image 900 in FIG. 9, the researcher would identify the paved pedestrian segments 904, pedestrian orientation nodes 906 at the intersections of the pedestrian segments and a statue 908.

At step 806, the researcher creates guide points 910 and label points 912 on the image 900. The guide points 910 are located at positions on the image 900 that correspond to locations at which guidance type information may be overlaid on the image 900. For example, guide points 910 may be located to correspond with road segments, nodes or intersections of road segments, pedestrian segments 904, pedestrian orientation nodes 906 and/or decision points in the image 900. In one embodiment, the guide points 910 are located at positions on the image 900 suitable for guidance information overlays, such as route highlights and guidance arrows. In one embodiment, guide points are placed at the endpoints of the road or pedestrian segments and at intermediate locations to provide shape points for the respective segment. In one embodiment, guide points 910 are placed at the visual end of the segments in the image 900, and the line-of-sight calculation may be used to determine placement of the guide points. For example, if a tree obstructs a view of a segment, one guide point is positioned as an endpoint just prior to the tree, and if the segment is visible after the tree, another guide point is placed as an endpoint after the tree. In another embodiment, the guide points on either side of the tree may specify that any route highlight between these guide points should be transparent so as not to highlight over the tree in the image. The label points 912 are located at positions on the image 900 that correspond to locations at which label type information may be overlaid on the image 900. For example, label points may be located to correspond with points of interest, such as the statue 908. In another embodiment, label points may be located to correspond with locations on the image 900 where advertisements, addresses, direction (north), icons, place names or any other information may be overlaid on the image 900.

In one embodiment, the researcher or a technician manually identifies the locations of the guide points and label points on the image. The researcher or technician digitizes the guide points and label points onto the image. The guide points 910 and label points 912 on the image 900 provide locations for the guidance information overlays. For example, if the geographic overlay is a route highlight to direct a user of the navigation system 100 to follow a road segment, a route highlight may be drawn connecting the guide points associated road segment in the image. In one embodiment, the pixels of the image corresponding to the identified locations for the guide points and label points are coded to facilitate placement of the overlays. An image is composed of numerous pixels. Each pixel may include one or more bits of overlay information as is known in the art. For example, the pixel value may have one bit of overlay information to support the use of overlays. The one bit of overlay information may be used as a toggle bit. Once the toggle bit is set, the pixel is ignored so that an overlay, such as the guidance information overlay, can be placed on the image. In another embodiment, the pixel value may have eight bits of overlay information, which may allow for variations in transparency between the overlay and the bottom image. The coding of the overlay pixels for the guide points and label points in the image enable the navigation system 100 to dynamically place several different guidance information overlays, such as a route highlight, maneuver arrows, direction or labels, on the image.

At step 808, the guide points and label points are associated with geographic features and/or text labels. For example, the guide points that correspond with a road segment are associated with the respective road segment ID; the guide points that correspond to a node is associated with the respective node ID; the guide points that correspond with a pedestrian segment are associated with the respective pedestrian segment ID; the guide point that correspond to an orientation node is associated with the orientation node ID; the guide point or label point that correspond to a point of interest is associated with the respective point of interest. Furthermore, label points are associated with corresponding text. The image data, guide point and label point information, associated features and labels are then stored in the geographic database as discussed in greater detail below.

In another embodiment, the steps 804, 806 and 808 are performed by overlaying vector data representing the geometry of the geographic area onto the image. Based on the distance visible in the image from the line of sight determination and the location and direction from which the image was captured, vector data representing the geometry of the geographic area visible in the image is obtained from the geographic database 116. For example, if the line of sight for the image is 20 meters, a vector data clip corresponding to the 20 meters area visible in the image is obtained from the geographic database 116. Because the image is captured at a height above ground surface, the image provides a birds-eye view of the geographic area. To accommodate the birds-eye perspective, the vector data clip of the geographic area in the image is obliquely projected onto the image. Additionally, the vector data clip may be appropriately scaled so the overlay of the vector data matches the features of the image. The overlaid vector data comprising vector points at nodes and shape points along segments align with their respective intersections and paths in the image. The vector data clip includes segment IDs and node IDs enabling identification of the paths and intersections visible in the image. Additionally, the image and associated vector data clip are stored in the geographic database.

IV. Geographic Database With Image Data

The image data collected as described above in conjunction with FIG. 7 is included in the geographic database 116 that represents some of the physical geographic features in the geographic region 202. In the embodiment of FIG. 4, the road segment data record 304 of the geographic database 116 contains an image data record 304(5), and the node data record 306(1) and 306(2) of the geographic database 116 also contains an image data record 306(1)(2) and 306(2)(2). In the embodiment of FIG. 5, the pedestrian segment data record 308 of the geographic database 116 contains an image data record 308(5), and the orientation node data record 310(1) and 310(2) of the geographic database 116 also contains an image data record 310(1)(4) and 310(2)(4). In one embodiment, the image data associated with the road segment data record 304, the node data record 306, the pedestrian segment data record 308 and/or the orientation node data record 310 are references to image data records 1000 as described in conjunction with FIG. 10. Additionally, the road segment data record 304, the node data record 306, the pedestrian segment data record 308 and/or the orientation node data record 310 may each be associated with several image data records 1000. For example, a node data record 306 representing an intersection of two roads may be associated with four image data records 1000.

Figure 10:
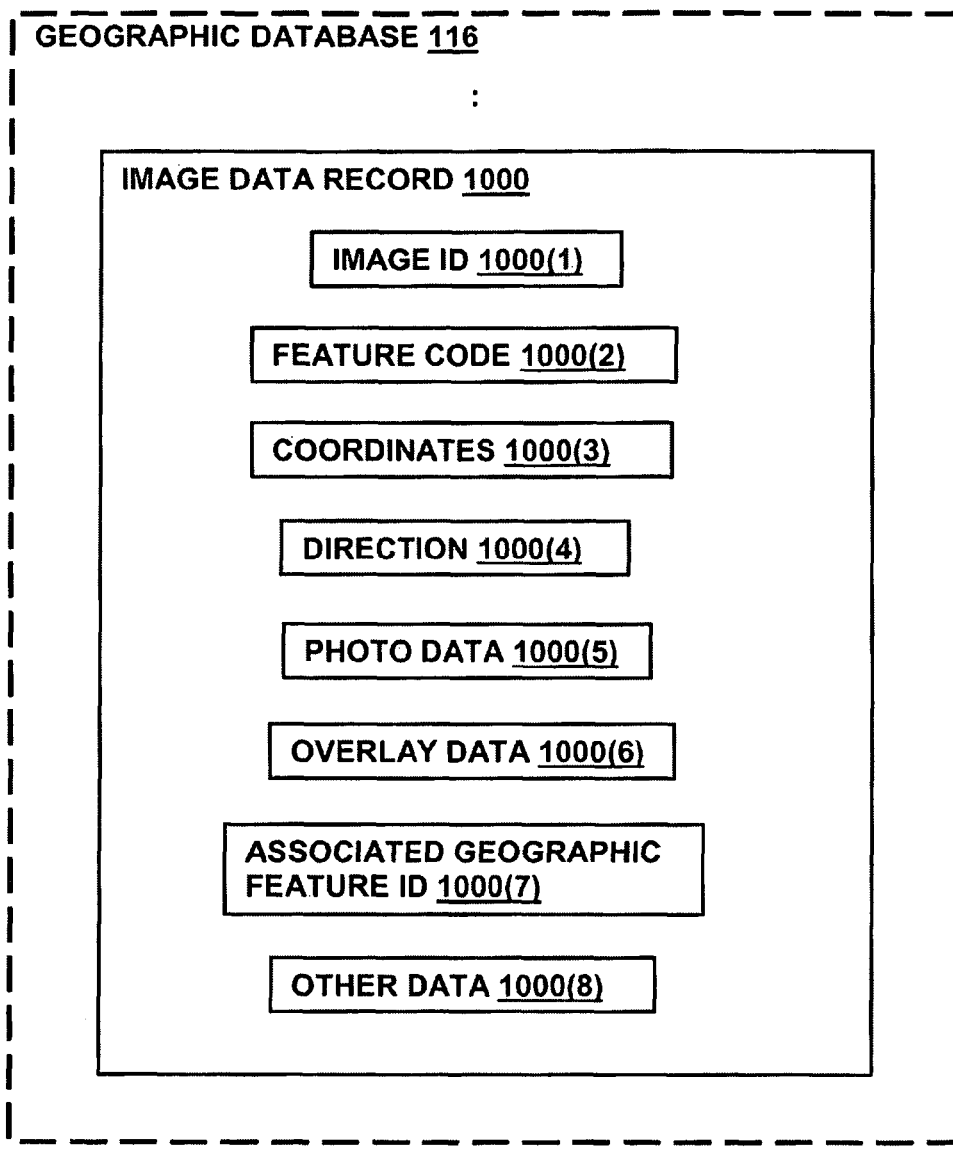
FIG. 10 is a block diagram of image data records, according to an exemplary embodiment.

FIG. 10 shows some of the components of an image data record 1000 contained in the geographic database 116. The image data record 1000 includes an image ID 1000(1) by which the data record can be identified in the geographic database 116. Each image data record 1000 has associated with it information (such as "attributes", "fields", etc.) that describes features of the represented image. The image data record 1000 may include data 1000(2) or a feature code that indicates a type of geographic feature captured in the respective image, such as a road segment, road intersection, pedestrian segment, orientation node, point of interest, scenic view or any geographic feature of the geographic region. The image data record 1000 includes data 1000(3) that indicate a location associated with the image, such as the longitude and latitude coordinates of the location. The image data record 1000 also includes data 1000(4) that indicates a direction associated with the image, such as a direction associated with a control point in the image.

The image data record 1000 includes data 1000(5) enabling the image to be displayed. Furthermore, the image data record 1000 may include overlay data 1000(6) providing data to allow the navigation system 100 to create guidance information overlays on the image. In one embodiment, the overlay data 1000(6) identifies overlay pixels corresponding to guide points and label points of the image. Additionally, the overlay data 1000(6) identifies the overlay pixels that correspond to geographic features, such as road segments, pedestrian segments, nodes and orientation nodes to allow route highlights and maneuver arrows to be overlaid on the image at locations corresponding to the geographic features. Furthermore, the overlay data 1000(6) may identify overlay pixels corresponding to points of interest or other items in the image suitable for guidance information overlays, such as text, advertising and icons. The overlay data 1000(6) may also indicate the style and information included in the guidance information overlay. By identifying the pixels in the image, guidance information overlays may be created dynamically by the navigation system 100, which may avoid having to store multiple copies of the same image. For example, the overlay may be an arrow pointing to a direction to walk, such as the arrow 602 depicted in FIG. 6. As another example, the overlay may be a route highlight comprising series of dots for the user of the navigation system 100 to follow. Any other overlay may be used, such as labels and direction indications. In an alternative embodiment, the overlay data 1000(6) may contain a plurality of established guidance information overlays, such as route highlights or maneuver arrows associated with road segments or pedestrian segments.

The image data record 1000 may also data 1000(7) indicating a geographic feature ID or several geographic features associated with the image. As discussed above in conjunction with FIG. 7, the image is cross-referenced with the geographic feature(s). The associated geographic feature ID data may be a road segment ID, node ID, pedestrian segment ID, orientation node ID, point of interest ID or a reference to any other geographic feature of the geographic database 116. The image data record 1000 may also include other data 1000(8).

In another embodiment, the image data record 1000 includes data providing a vector data clip (not shown) corresponding to the photo data 1000(5).

V. Guidance Information Overlays on Images

As discussed above in conjunction with FIG. 1, the navigation system 100 includes navigation application software programs 110 that provide the various navigation features and functions. In one embodiment, the navigation functions and features may include route calculation 124 and route guidance 126. The route calculation function 124 receives a request to calculate a route to a desired destination. The request may be in the form of an identification of a starting location and a desired destination location. The identification of these locations may include the geographic coordinates of these locations. The route calculation function may also be provided with other data or parameters, such as preferences (e.g., scenic route, handicap access, or any other preference). Given at least the identification of the starting location and the destination location, the route calculation function 124 attempts to determine one or more solution routes between the starting location and the destination location. A solution route is formed of a series of connected road and/or pedestrian segments over which the user of the navigation system 100 can travel from the starting location to the destination location. When the route calculation function 124 calculates a route, it accesses the geographic database 116 and obtains road segment data entities 304 and/or pedestrian segment data entities 308 that represent segments around and between the starting location and the destination location. The route calculation function 124 uses the information in the road and/or pedestrian segment data entities 304 and 308 to attempt to determine at least one valid solution route from the starting location to the destination location. In determining a valid solution route for the pedestrian to travel, the route calculation program 124 uses the data attributes associated with the road and/or pedestrian segment data entities to account for preferences. The route calculation function 124 may attempt to find solution routes that takes the least time to travel, that covers the least distance, or that meets some other specifiable criteria.

The route calculation function 124 may use various means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

The route calculation function 124 provides an output. In one embodiment, the output of the route calculation function 124 is in the form of an ordered list identifying a plurality of road and/or pedestrian segment data entities. The plurality of road and/or pedestrian segment data entities represent the road and/or pedestrian segments that form the continuous navigable route between the starting location and the destination that had been calculated by the route calculation function 124. The route calculation function 124 may calculate more than one solution route including alternative ordered lists of the plurality of road and/or pedestrian segments.

As discussed above in conjunction with FIG. 1, the navigation system 100 includes navigation application software programs 110 that provide the navigation feature and function of route guidance 126 for the user of the navigation system 100. The route guidance function 126 provides detailed directions for reaching a desired destination. In one embodiment, the list of road and/or pedestrian segment data entities determined by the route calculation function 124 is provided to the route guidance function 126. The route guidance function 126 uses the information in the list, as well as additional information from the geographic database 116, to provide instructions to the end user to travel the route defined by the list output by the route calculation function 124. The route guidance function 126 may include functions that identify locations along the calculated route at which maneuvering instructions may be provided to the end user. The route guidance function 126 may provide the maneuvering instructions all at once, or alternatively, the route guidance function 126 may provide the maneuvering instructions one at a time as the end user is traveling. In one embodiment, each maneuvering instruction is provided separately (or in small groups of combined maneuvering instructions) in advance of when the specific maneuver is required to be taken so that the end user can prepare to make the required maneuver. The output of the route guidance function 126 is provided to the end user through a user interface 114 included on the computing platform 102. The output of the route guidance may be conveyed audibly through speech synthesis or on a visual display.

Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

In order to provide maneuvering instructions at appropriate times and/or locations, the navigation system 100 uses data from the positioning system (112 in FIG. 1). The positioning system 112 determines the position of the end user (computing platform 102) as he or she is traveling. A positioning (map-matching) function 130 in the navigation programming 110 compares the user's position determined by the positioning system 112 to the positions of the road and/or pedestrian segments represented by the road and/or pedestrian segment data entities in the solution route. Using this comparison, the maneuver instructions, which are related to positions along the solution route, can be provided at appropriates times as these positions are approached.

The route guidance function 126 may also provide the end user with information about the remaining distance to the destination location. The list of road and/or pedestrian segment data entities from the route calculation function 124 may also be provided to the map display function 128. The map display function 128 uses the information in the list, as well as additional information from the geographic database 116, to provide graphical maps on a display of the user interface 114. The graphical maps illustrate the areas through which the calculated route passes. The path of the calculated route may be highlighted on the displayed maps.

In one embodiment, the route guidance function 126 also provides images with guidance information overlays. The images with overlays may be provided in conjunction with maneuver instructions. In an alternative embodiment, the route guidance function 126 provides an image with a guidance information overlay instead of audio or textual maneuver instructions. In another embodiment, the route guidance function 126 provides an image with a guidance information overlay at various locations along the solution route, such as at decision points. In a further embodiment, the route guidance function 126 provides a series of images with guidance information overlays to provide a continuous visual representation of the solution route.

Figure 11:
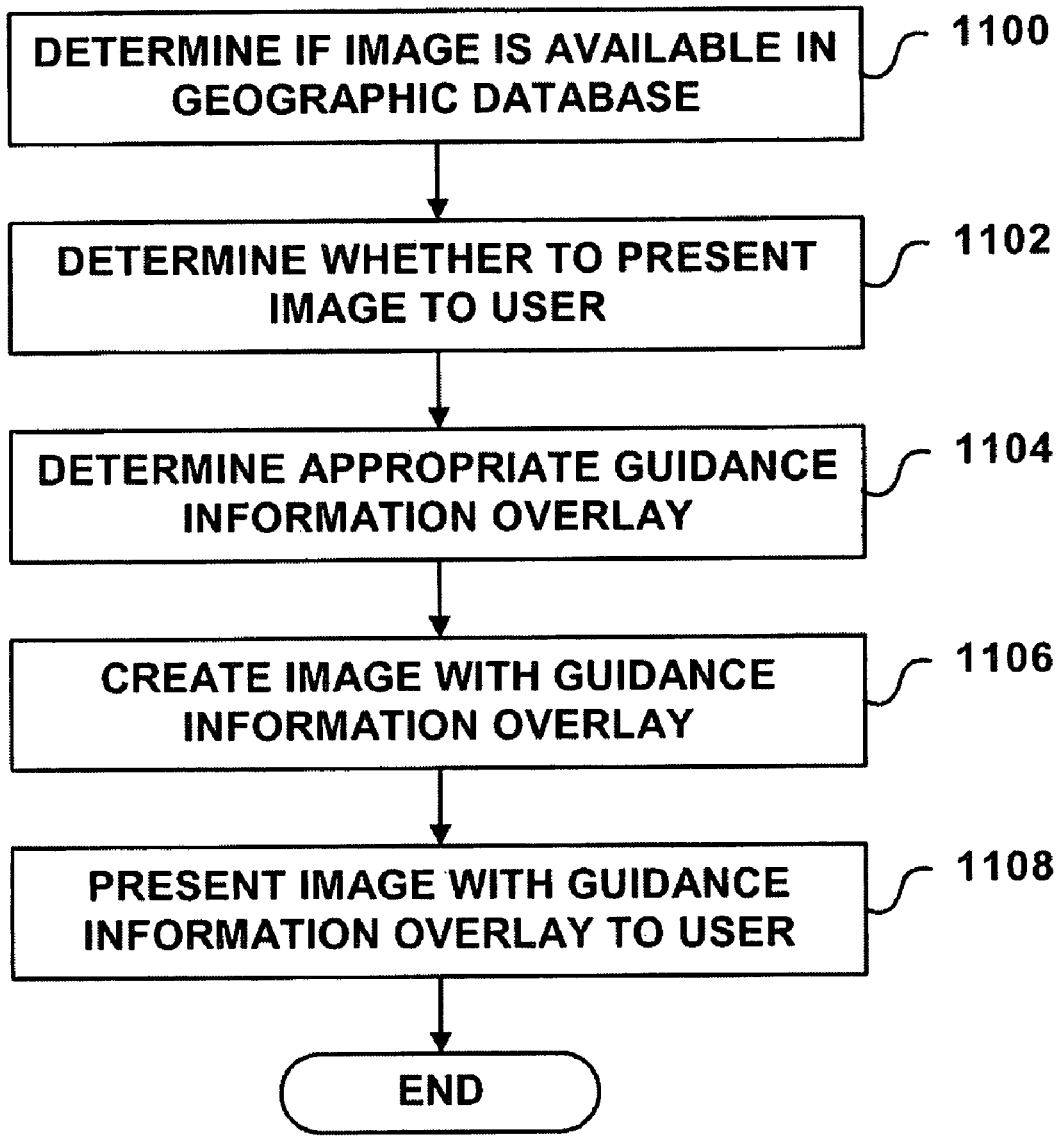
FIG. 11 is a flow chart for using images to provide guidance, according to an exemplary embodiment.

FIG. 11 is a flow chart that depicts the steps performed by the route guidance function 126 to provide an image with a guidance information overlay. At step 1100, the route guidance function 126 determines whether an image is available in the geographic database 116 corresponding to the current location and direction of the navigation system 100 as it travels along the solution route provided by the route calculation function 124. In one embodiment, the route guidance function 126 references the road segment data record 304, node data record 306, pedestrian segment data record 308 and/or orientation node data record 310 corresponding to the current location of the navigation system 100 to determine whether an image data record 1000 exists. In one embodiment, the determination includes whether an appropriate image based on the direction of travel and/or time of day is available from the reference image data record 1000. At step 1102, the route guidance function 126 determines whether to present the image to the user of the navigation system 100 via the user interface 114. In one embodiment, the navigation system 100 provides images only when requested by the user of the navigation system 100. For example, the user may request the images using the user interface 114. In another embodiment, the navigation system 100 provides images automatically at every decision point along the calculated route.

At step 1104, the route guidance function 126 determines an appropriate guidance information overlay. The guidance information overlay may be a maneuver arrow, a line or plurality of dots highlighting the solution route or alternate routes, text labels, direction labels or any other information. The route guidance function 126 may obtain data from the image data record 1000 indicating the overlay pixels corresponding to the road segments, pedestrian segments, nodes and/or orientations nodes comprising the current portion of the route. Additionally, the route guidance function 126 may select appropriate guidance overlays to place at the overlay pixels. For example, if the driving direction is a right turn onto a road segment at the next intersection, the route guidance function 126 selects the guidance information overlay that provides a maneuver arrow for turning right onto the road segment on the associated image. At step 1106, the image with the guidance information overlay is created. FIGS. 6, 12-15 will be used to illustrate embodiments of the image with guidance information overlay.

FIG. 6 illustrates one embodiment of the guidance information overlay of a maneuver arrow 602. The image 600 is a 360-degree panoramic photograph of a road node. The image 600 include the guidance information overlay of the maneuver arrow 602 indicating a direction of travel or turn required from the current location onto a connected road segment to follow the solution route. The 360-degree panoramic photograph 600 helps to orient the user of the navigation system 100 and may be especially helpful to a pedestrian. The guidance information overlay of the maneuver arrow 602 directs the user to turn onto an indicated road segment that the user may more readily identify by comparing the features in the image 600 to their visible surroundings. Additionally, the maneuver arrow 602 may be any color; the color may be chosen in a manner such that the user quickly notices the guidance information overlay 602. While FIG. 6 depicts a 360-degree photograph, the image may be a single-view photograph.

In another embodiment, the guidance information overlay includes a label 604 indicating a visible point of interest along the calculated route. As shown in FIG. 6, the label 604 indicates a "bank" is along the solution route. In other embodiments, the label may be associated any other point of interest visible to the user from the solution route. Furthermore, the label 604 may be an icon indicating the type of point of interest, a description of the point of interest, a name of the point of interest or any other information regarding the point of interest. The label 604 provides supplemental guidance information to the user and may be used to confirm that the user is following the calculated route. Additionally, guidance information overlay may comprise labels for other points of interests or features in the image to help orientate the user. For example, the guidance information overlay may comprise a label identifying a readily visible landmark such as a communications tower. In one embodiment, the guidance information overlay is a label indicating a direction. In another embodiment, the overlay may comprise an advertisement associated with a business visible in the image 600 or a business located close to the area of the image 600.

Figure 12:
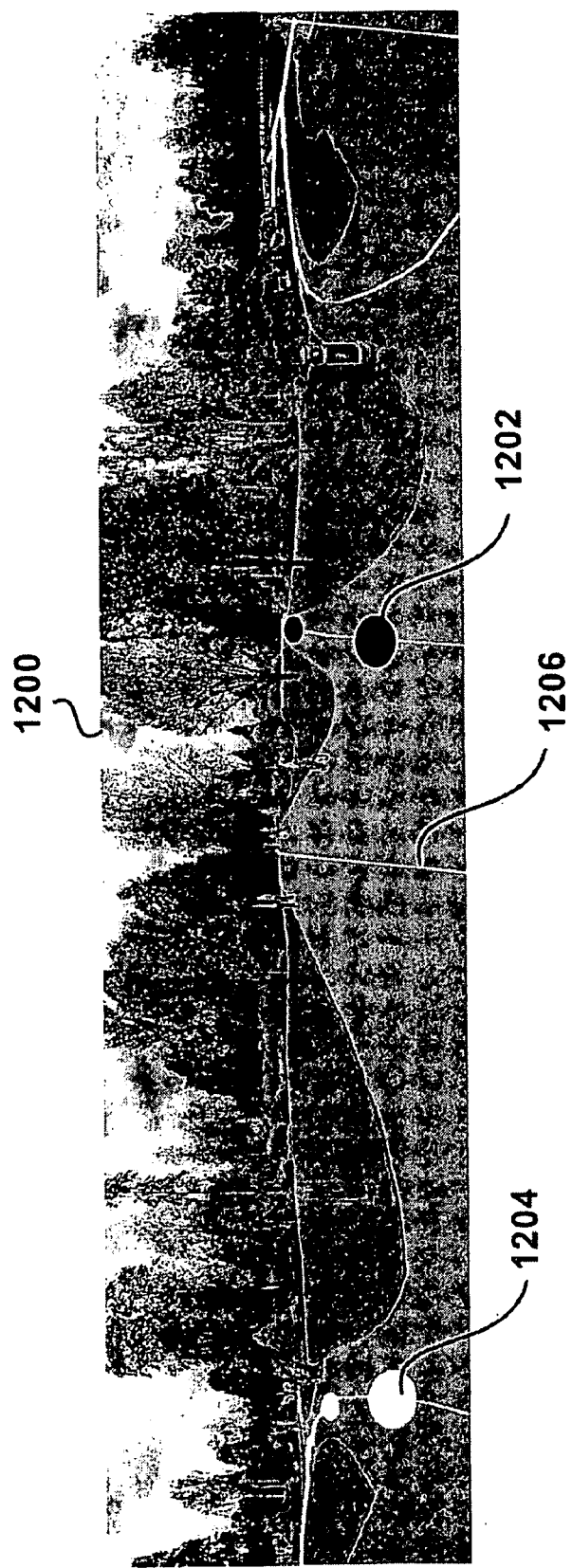
FIG. 12 is a 360-degree panoramic image depicting the use of guidance information overlays, according to an exemplary embodiment.

FIG. 12 illustrates another embodiment of the guidance information overlay. The image 1200 in FIG. 12 is a 360-degree photograph. The guidance information overlay is a route highlight as depicted with a plurality of dots or "bread crumbs." A first series of dots 1202 are used depict the portion of the solution route that has been traveled and a second series of dots 1204 are used to depict the next road and/or pedestrian segment(s) of the solution route. The dots 1204 allow the user to visually identify the next portion of the route on the image 1200 and visually orient him or her in the geographic region using the image and guidance information overlay. While dots are used in FIG. 12, any route highlight may be used such as a series of arrows, a solid line 1206, a dash line or any other shape. The first and second series of dots 1202 and 1204 may be different colors to distinguish the two portions of the solution route. As seen in FIG. 12, the dots closest to the pedestrian may appear larger than the dots further away. The interval and size of the dots is described with more detail with reference to FIG. 13.

Figure 13:
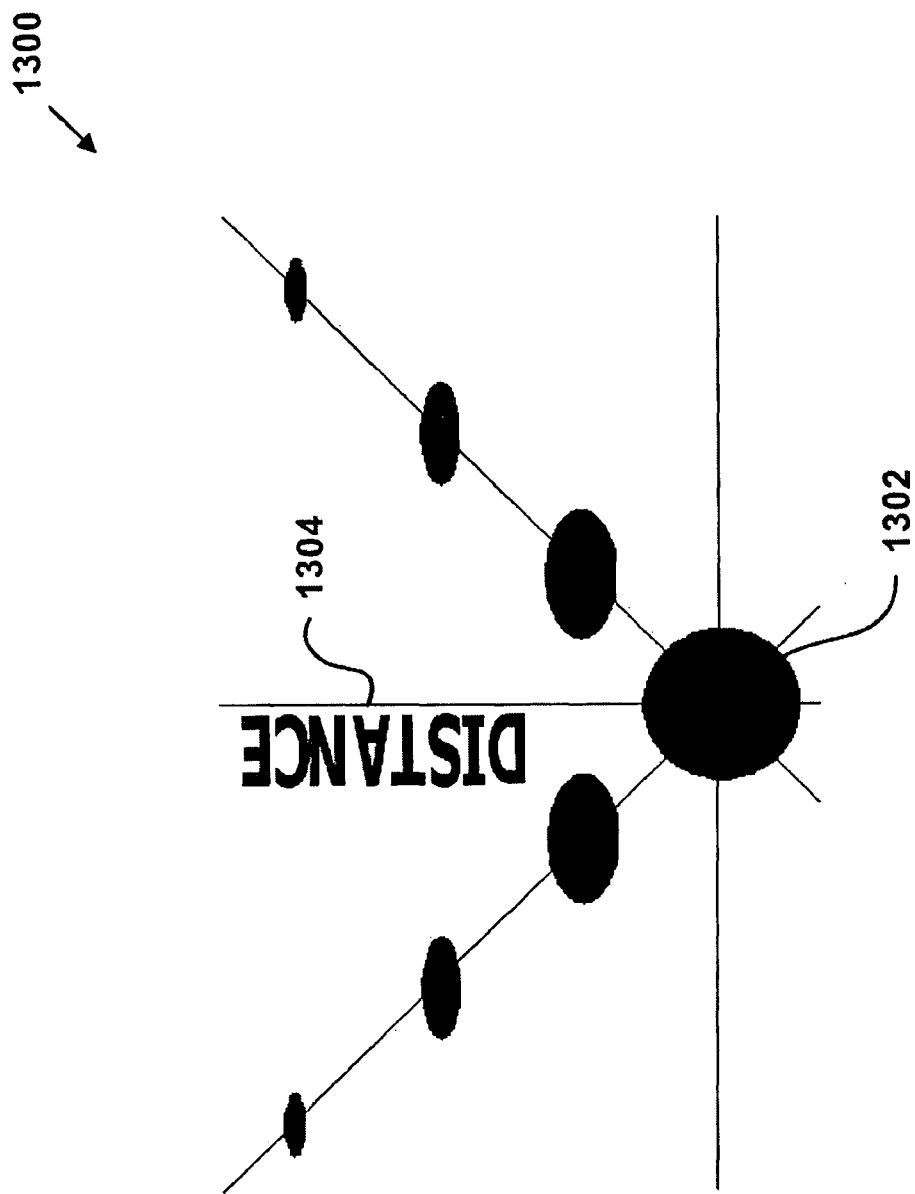
FIG. 13 is a pictorial representation of overlay dot size used in the guidance information overlays, according to an exemplary embodiment.

FIG. 13 is a pictorial representation 1300 of guidance information overlay comprising the series of dots, according to an exemplary embodiment. Dot 1302 may indicate a location at which the image was captured. Additionally, the dot 1302 may be used to represent the location of the user in the image, such as a "you are here" guidance information overlay on the image. As the distance 1304 from the dot 1302 increases, the size of the dots may decrease proportionally. The interval and scale of the dots may be selected to provide adequate connectivity for guidance and may be based on the line-of-sight calculation.

Figure 14:
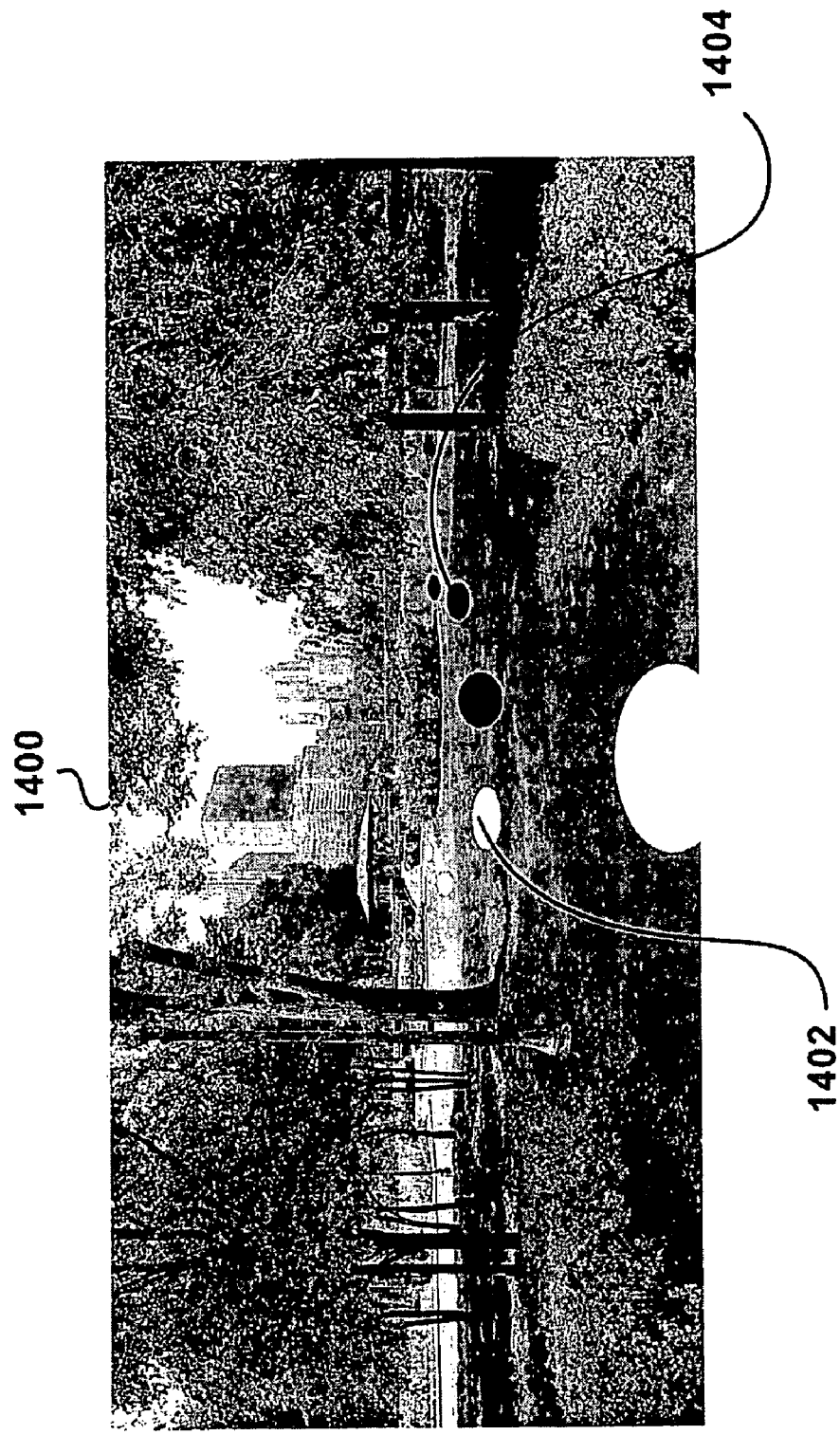
FIG. 14 is an image depicting the use of the guidance information overlays, according to another exemplary embodiment.

FIG. 14 illustrates another embodiment of the guidance information overlay. FIG. 14 is a single-view image 1400 depicting a guidance information overlay that shows alternative routes, according to an exemplary embodiment. As mentioned above, the route calculation function 124 may calculate several route solutions between the origin and destination. These route solutions may comprise some of the same road and/or pedestrian segments while including different segments. The one or more alternative routes may vary in time or distance of travel, but the alternative routes may have different features that may be attractive to a user. For example, alternative routes may be more scenic, have a flatter grade, be well lit at night, handicapped accessible and so on.

Referring to FIG. 14, the guidance information overlay includes a route highlight represented by a first series of dots 1402 depicting a first route and a route highlight represented by second series of dots 1404 depicting a second route. The first and second series of dots 1402 and 1404 may be different colors to distinguish the two routes. The first series of dots 1402 highlights a main route, while the second series of dots 1404 highlights an alternative route. The guidance information overlay provides the user an option to follow either route highlight 1402 or 1404 around the fountain. For example, the user may select the second route 1404 because it is tree-lined, which may provide more shade. While, this embodiment is depicted using two routes, the number of routes may be more than two. Further, the route highlights 1402 and 1404 may also overlay road segments 210 in a road network 208.

Figure 15:
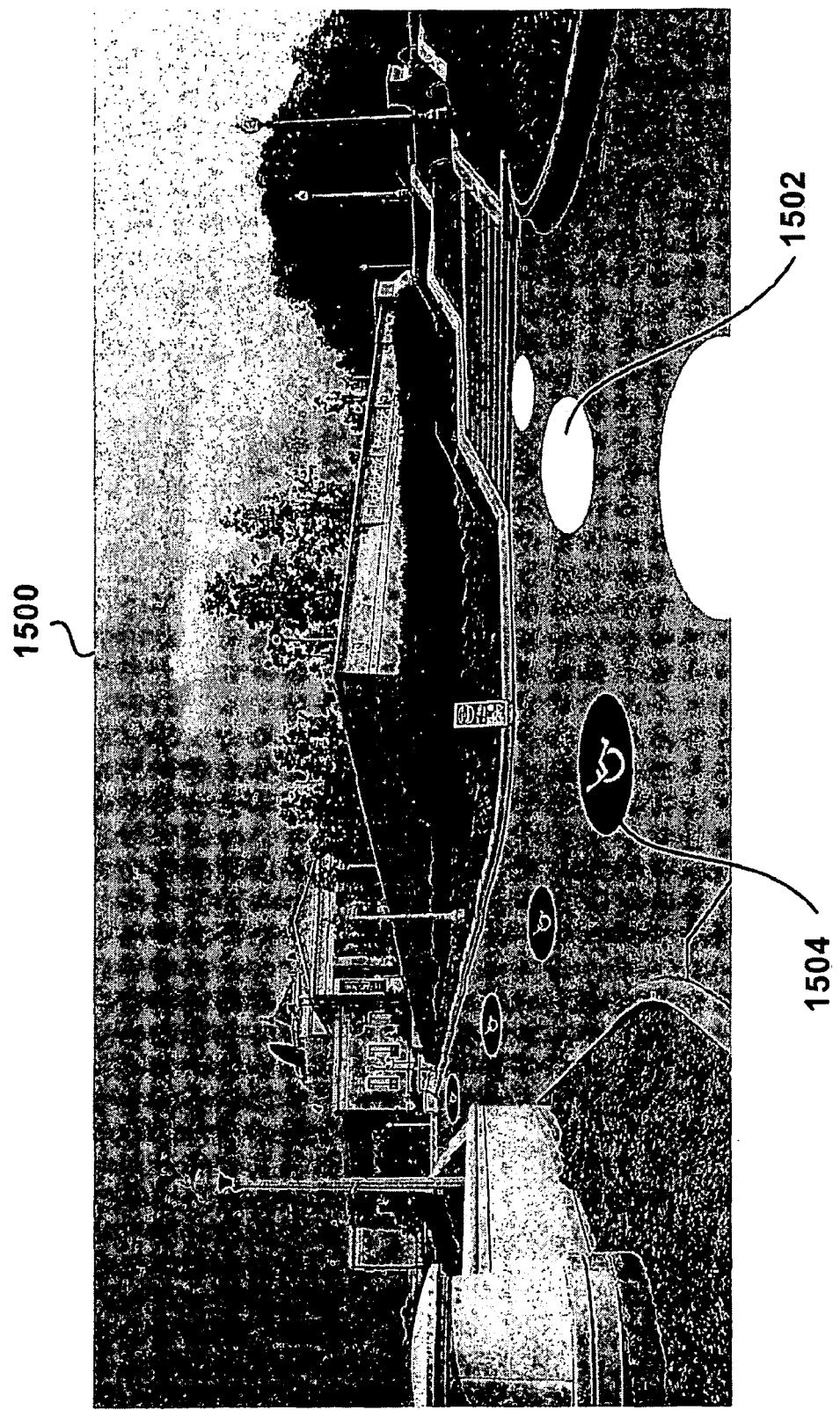
FIG. 15 is an image depicting the use of the guidance information overlays, according to another exemplary embodiment.

In another embodiment, the guidance information overlays convey additional information about the respective depicted alternative routes. FIG. 15 is a single view image 1500 including guidance information overlays to show alternative routes, according to another exemplary embodiment. In this example, the guidance information overlay includes a route highlight represented by a first series of dots 1502 depicting a first route and a route highlight represented by a second series of dots 1504 depicting a second route. The first series of dots 1502 may highlight a more direct route containing steps, while the second series of dots 1504 may highlight an alternative route that is handicapped accessible. The second series of dots 1504 includes a handicap icon on each of the dots, which describes a feature of the alternative route 1504. The route guidance overlay of the route highlight with handicap icon visually provides useful information to the user of the navigation system 100. For example, the route highlight with the handicap icon may direct the user to a handicapped accessible entrance to a building. Additionally, the user may be pushing a stroller, wearing roller skates, or have a medical condition that makes it difficult to traverse the route highlight 1502 having stairs.

While FIG. 15 depicts the use of a handicap icon in the guidance information overlay, a variety of other symbols or icons may be used to highlight the features of a particular route. For example, a tree symbol overlay may be used to identify a tree-lined pathway; a water fountain icon or toilet icon may be used to identify a route that passes by a water fountain or toilets, respectively; and icons or symbols may be used to identify well-lit route, quiet route, scenic route, crowded route, peaceful route, bicycle friendly route, or any other feature. The route guidance function 126 may include the appropriate symbol or icon corresponding to the features of the solution route.

Figure 16:
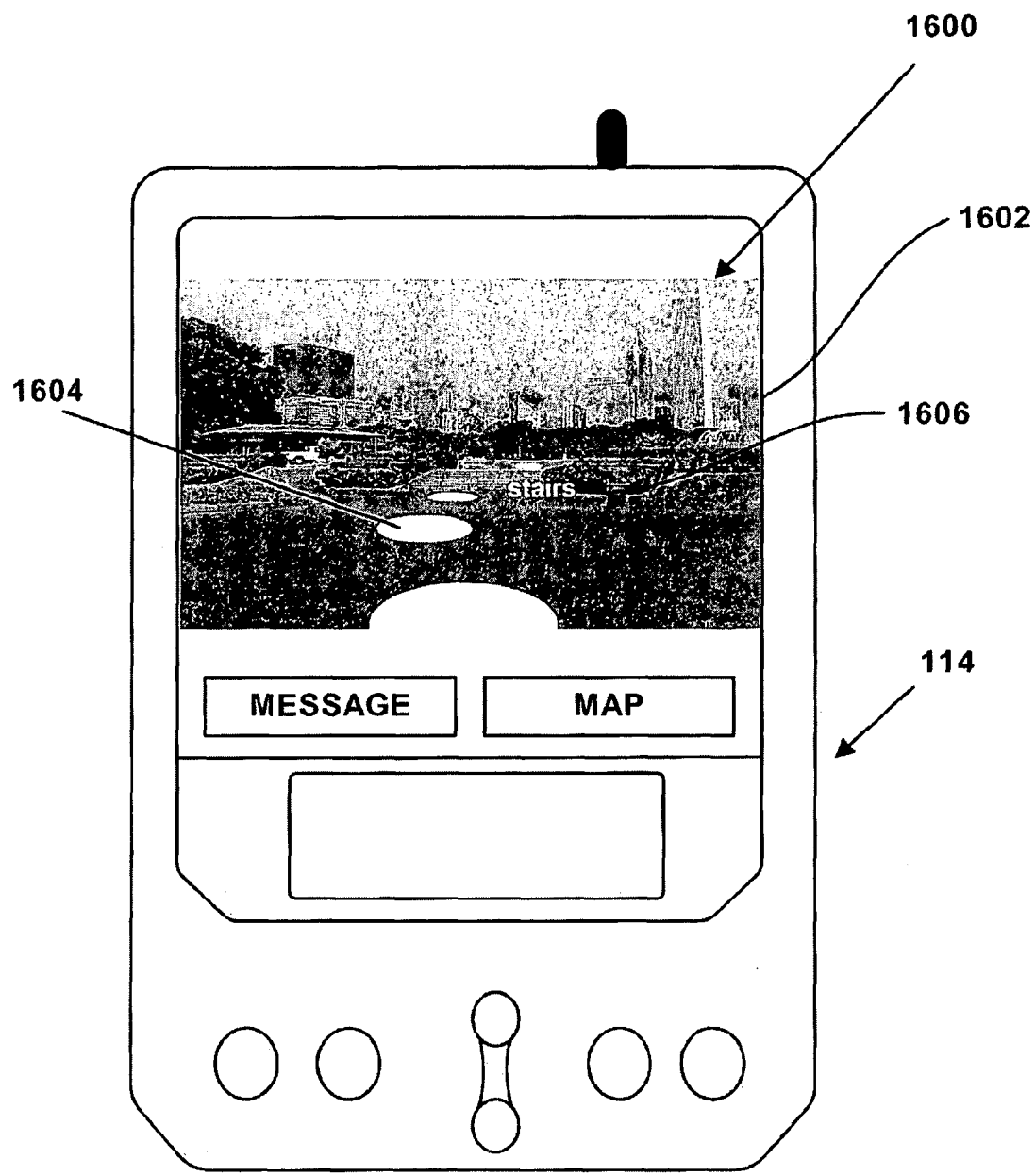
FIG. 16 is a screen shot depicting the use image with guidance information overlay as provided by the navigation system depicted in FIG. 1, according to an exemplary embodiment.

Referring again to FIG. 11, after the image with guidance information overlay is created, the user of the navigation system 100 is presented the image with guidance information overlay via the user interface 114. FIG. 16 is a screen shot 1600 of the user interface 114 depicting an image 1602 with guidance information overlays 1604 and 1606, according to an exemplary embodiment. The image 1602 with the guidance information overlays 1604 and 1606 orients the user and provides reassurance that the user is correctly following the solution route to the destination. The user may obtain guidance messages (textual or audio) or a map by touching the message icon or the map icon depicted in the screen shot 1600.

Figure 17:
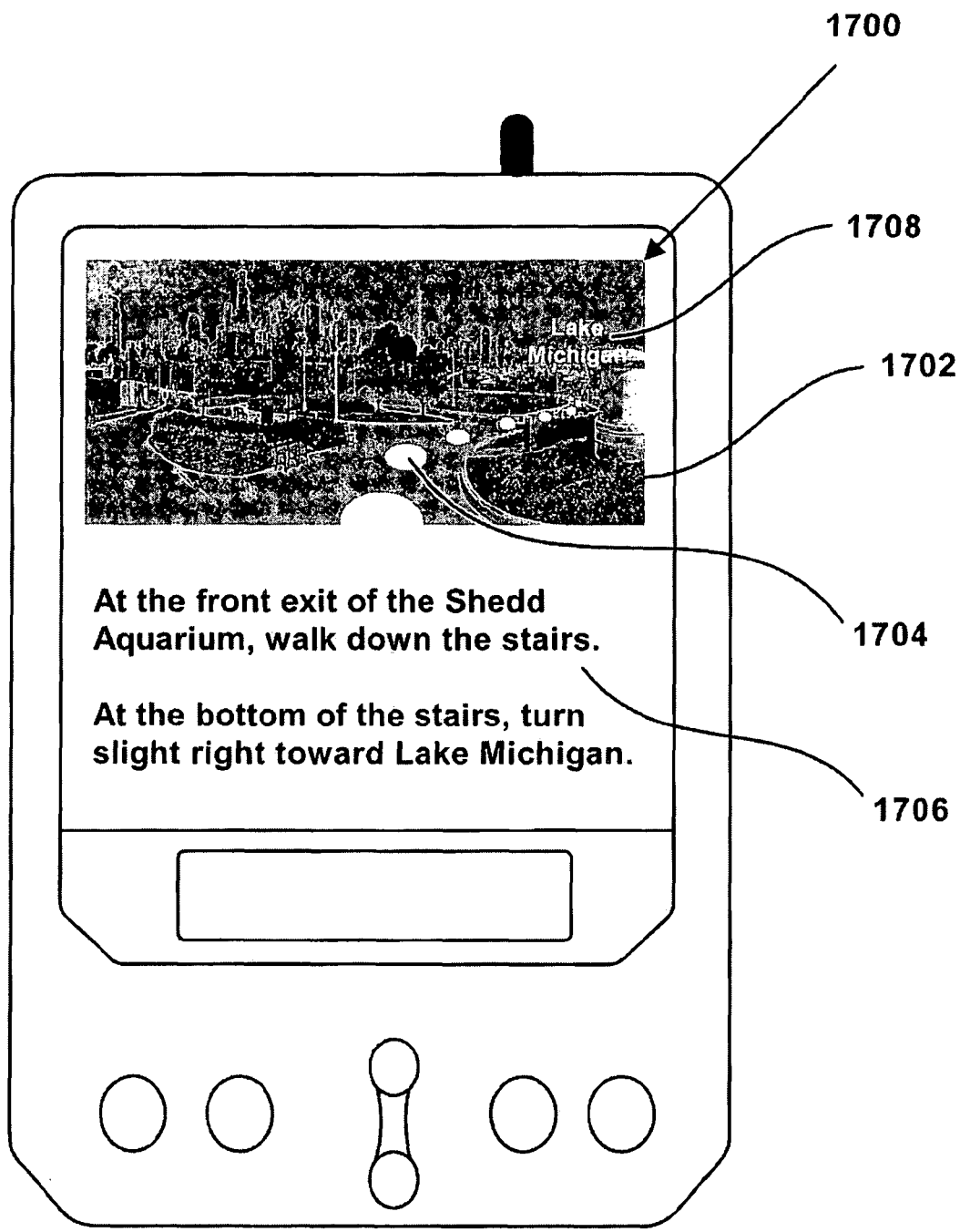
FIG. 17 is a screen shot of an image with guidance information overlay and a textual guidance message provided by the navigation system depicted in FIG. 1, according to an exemplary embodiment.

FIG. 17 illustrates another embodiment for presenting the image with guidance information overlay to the user. FIG. 17 is a screen shot 1700 of a user interface 114 that provides an image 1702 with guidance information overlay 1704 of a route highlight and a textual guidance message 1706. In the example depicted in FIG. 17, user interface 114 provides the image 1702 of what the pedestrian will see as traveling the solution route, the guidance information overlay 1704 visually directs the user along the route and the textual guidance message 1706 describes the path. In one embodiment, the image 1702 includes labels 1708 identifying features referenced in the textual guidance message, such as "Lake Michigan."

Figure 18:
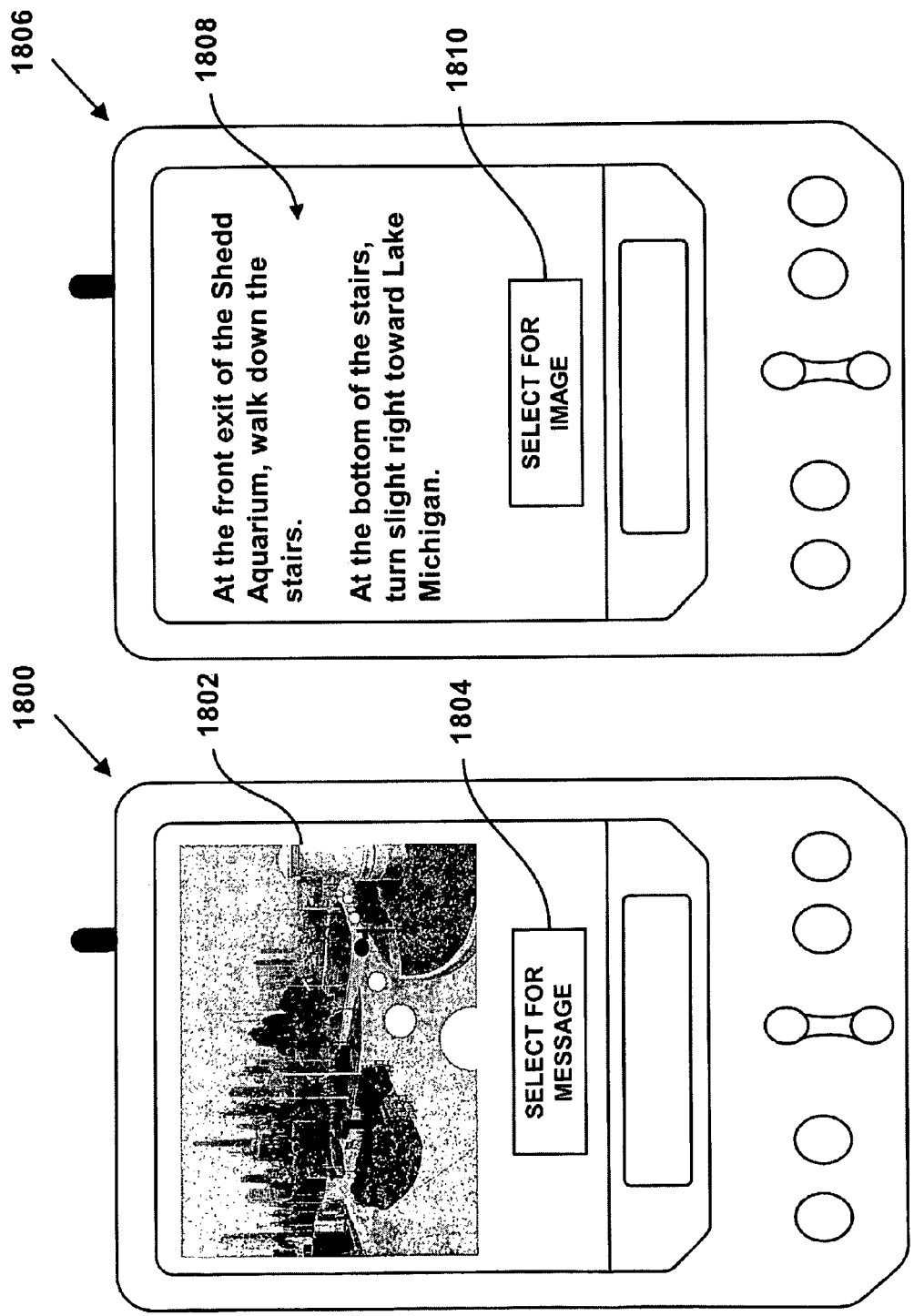
FIG. 18A is a screen shot of an image with guidance information overlay and a touch-screen icon for requesting a guidance message as provided by the navigation system depicted in FIG. 1, according to an exemplary embodiment.
FIG. 18B is a screen shot of a guidance message and a touch-screen icon for requesting an image with guidance information overlay as provided by the navigation system depicted in FIG. 1, according to an exemplary embodiment.

FIGS. 18A and 18B illustrate a further embodiment for presenting the image with guidance information overlay to the user. FIG. 18A is a screen shot 1800 of an image 1802 with a guidance information overlay and a touch-screen icon 1804 for requesting the display of a textual guidance message, while FIG. 18B is a screen shot 1806 of a textual guidance message 1808 and a touch-screen icon 1810 for requesting the display of an image. FIGS. 18A and 18B include the same image 1702 with guidance information overlay and textual guidance message 1706 as depicted in FIG. 17; however, in this example, the image 1802 and the guidance message 1808 are shown on different screens. The user may use the touch-screen icons 1804, 1810 to toggle between the photograph 1802 and the pedestrian guidance message 1808. While this example uses a touch-screen input mechanism to the user interface 114, any other input mechanism to the user device may be used.

The screen shots 1600, 1700, 1800 and 1806 have been depicted on a personal digital assistant; however, other user devices, such as a cellular telephone, a vehicle navigation system, and a computer may also be used to display the images and associated guidance information overlays. Further, a user may obtain the images and associated guidance information overlays prior to traveling the solution route. As another example, a person may obtain the images from a stationary computer, which may be printed and taken with the user. As yet another example, the user may obtain the images with the guidance information overlays from a public-access device, such as an Internet web site, a computer terminal, or a kiosk. Additionally, the user may take a virtual tour of the solution route using the images obtained prior to traveling.

VI. Alternative Implementation with Information Overlays on Images

Figure 19:
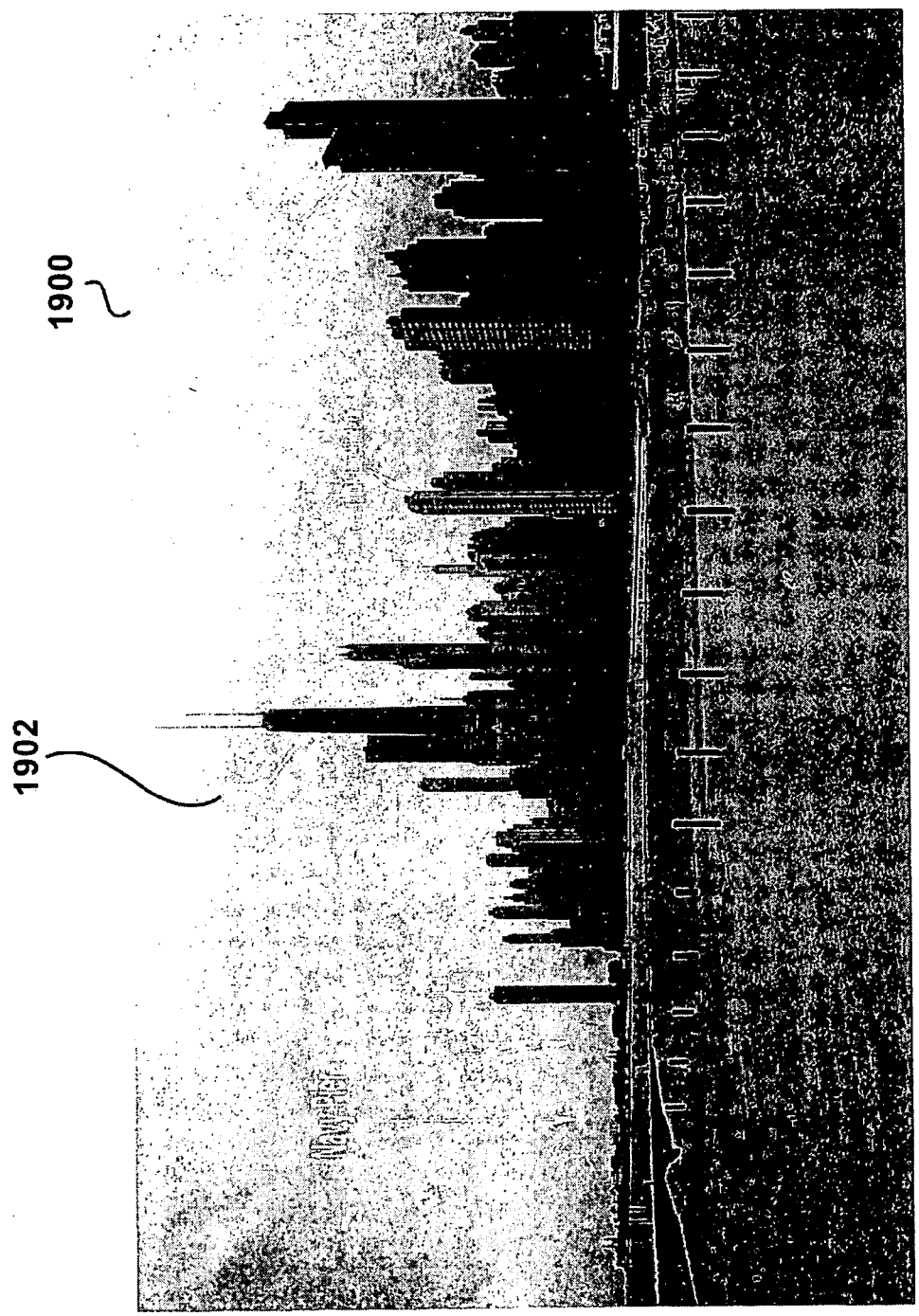
FIG. 19 is an image including label overlays provided by the navigation system depicted in FIG. 1, according to an exemplary embodiment.

The above description presented images with guidance information overlays for guiding a user of a navigation system 100 along a solution route to a desired destination. FIG. 19 illustrates another implementation of the images with information overlays. FIG. 19 is a scenic image 1900 including label overlays 1902, according to an exemplary embodiment. The label overlays identify popular locations in the cityscape image 1900. As illustrated in FIG. 19, the information overlays include text labels identifying the names of a variety of buildings in the image 1900. In addition to labels for buildings, the image may include labels for any point of interest or geographic feature in the image. In another embodiment, the information overlays may comprise addresses corresponding to the buildings. In yet another embodiment, the information overlays may comprise historical, tourist type or advertisement labels. A user may use the information overlays of the image for entertainment purposes. The information overlays may allow the user to identify important building and structures, which may be of interest to tourists, architects, and the like.

In one embodiment, the navigation system 100 presents the image 1900 with label overlays 1902 on the user interface 114 for the user to enter a location. The user may select a label or building on the image 1900 to enter as his or her desired location. For example, if the user device is a PDA, the pedestrian may select a label by touching a touch-screen display using a stylus. In another embodiment, the user may enter the label name via the user interface as the desired location.

In one embodiment, the user may use the image 1900 to enter a desired destination. As discussed above in conjunction with FIG. 1, the navigation system 100 includes the route calculation function 124. The route calculation function 124 receives a request to calculate a route to a desired destination. The request may be in the form of a request to enter a destination using an image with information overlays. The user is then presented with the image with information overlays. For example, a tourist in Chicago may request to enter a destination using the scenic image 1900 and the navigation system provides the user with the image 1900. The user selects a destination using the image 1900, and the route calculation function 124 uses the entered destination to calculate a solution route from the current location of the user to the entered destination. In another embodiment, the user enters the starting location for the route using the image 1900. For example, a tourist kiosk provides the image 1900 and enables users to determine routes from and to various destinations. After the starting location and destination location have been entered, the route calculation function 124 attempts to determine one or more solution routes between the starting location and the destination location as described above. Additionally, the navigation system 100 provides route guidance functions and features for the solution route to guide the user along the solution route to the entered desired destination. The route guidance may comprise images with guidance information overlays, textual messages or any other guidance information. Additionally, the navigation system 100 may provide a map display to the user.

Additionally, the image 1900 may be used to enter a location for any navigation feature and function. In another embodiment, the user may use the image 1900 to enter a desired point of interest to request information about the point of interest. For example, the user may request information about businesses, times of operation, telephone numbers and any other information. Furthermore, the label overlays 1902 of the image may contain advertisements.

It is intended that the foregoing detailed description be regarded as illustrative rather than limiting and that it is understood that the following claims including all equivalents are intended to define the scope of the invention

We claim:

1. A method of operating a navigation system comprising:
    determining a route between an origin and a destination;
    providing a photographic image showing a geographic area through which said route passes, wherein said photographic image is obtained from a geographic database, wherein said photographic image shows the geographic area from a land-based viewpoint; and
    overlaying a route highlight on said photographic image identifying a path to be traveled, wherein the route highlight extends along the path for a distance visible in the photographic image.

2. The method of claim 1 further comprising:
    providing labels on said photographic image.

3. The method of claim 1 wherein said photographic image is associated with road segment data in the geographic database.

4. The method of claim 1 wherein said photographic image is associated with location information in the geographic database.

5. The method of claim 1 wherein said route highlight includes a symbol indicating a feature of the path.

6. The method of claim 1 wherein said symbol indicates handicap accessibility.

7. The method of claim 1 wherein said photographic image provides an angle of view greater than 180 degrees.

8. A navigation system comprising:
    a geographic database;
    a processor; and
    a guidance application executable on said processor to obtain a photographic image from said geographic database and to overlay a route highlight on said photographic image; wherein said route highlight extends along a path shown in said photographic image for a distance visible in said photographic image, wherein said photographic image provides a land-based view.

9. The system of claim 8 wherein said guidance application displays said photographic image with said route highlight on a display.

10. The system of claim 8 wherein said guidance application places a text label on said photographic image to identify a point of interest visible is the photographic image.

11. The system of claim 8 wherein said photographic image is associated with road segment data in the geographic database.

12. The system of claim 8 wherein said photographic image is associated with location information in the geographic database.

13. The system of claim 8 wherein said route highlight includes a symbol indicating a feature of the path.

14. The system of claim 8 wherein said photographic image provides an angle of view greater than 180 degrees.

15. A method for providing navigation-related information comprising:
    determining a location; and
    providing a photographic image of a geographic area corresponding to said location, wherein said photographic image provides a land-base viewpoint, wherein said photographic image provides an angle of view greater than 180 degrees, wherein said photographic image is obtained from a geographic database, wherein in said photographic image shows a route highlight that extends along a path shown in said photographic image for a distance visible in said photographic image.

16. The method of claim 15 wherein the photographic image includes a label identifying a point of interest.

17. The method of claim 15 wherein the photographic image is comprised of at least two photographs having angle of view less than 180 degrees stitched together.

18. The method of claim 15 wherein the photographic image includes advertising.

* * * * *